US012407110B2

(12) United States Patent
Wang et al.

(10) Patent No.: US 12,407,110 B2
(45) Date of Patent: Sep. 2, 2025

(54) ANTENNA APPARATUS AND ELECTRONIC DEVICE

(71) Applicant: HUAWEI TECHNOLOGIES CO., LTD., Guangdong (CN)

(72) Inventors: Jikang Wang, Shanghai (CN); Laiwei Shen, Shanghai (CN); Jiaming Wang, Shanghai (CN); Liang Xue, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 18/259,581

(22) PCT Filed: Dec. 29, 2021

(86) PCT No.: PCT/CN2021/142660

§ 371 (c)(1),
(2) Date: Jun. 27, 2023

(87) PCT Pub. No.: WO2022/143803

PCT Pub. Date: Jul. 7, 2022

(65) Prior Publication Data

US 2024/0055778 A1 Feb. 15, 2024

(30) Foreign Application Priority Data

Dec. 30, 2020 (CN) ......................... 202011628760.9

(51) Int. Cl.
*H01Q 21/28* (2006.01)
*H01Q 21/30* (2006.01)

(52) U.S. Cl.
CPC ............. *H01Q 21/28* (2013.01); *H01Q 21/30* (2013.01)

(58) Field of Classification Search
CPC H01Q 7/00; H01Q 9/26; H01Q 13/10; H01Q 21/0006; H01Q 21/24; H01Q 21/28; H01Q 21/29; H01Q 21/30
See application file for complete search history.

(56) References Cited

U.S. PATENT DOCUMENTS

| | | | | |
|---|---|---|---|---|
| 12,230,896 B2 * | 2/2025 | Hsu | .......................... | H01Q 5/35 |
| 2012/0231846 A1 * | 9/2012 | Mahanfar | .............. | H01Q 5/342 455/562.1 |
| 2017/0141820 A1 * | 5/2017 | Kim | ......................... | H04B 1/40 |
| 2020/0076062 A1 * | 3/2020 | Lee | ........................ | H01Q 5/307 |
| 2022/0166132 A1 * | 5/2022 | Chu | ..................... | H04B 1/0064 |

FOREIGN PATENT DOCUMENTS

| | | | |
|---|---|---|---|
| CN | 209747728 | U | 12/2019 |
| CN | 111384585 | A | 7/2020 |
| CN | 112003020 | A | 11/2020 |
| CN | 116529958 | A | 8/2023 |
| WO | 2020134961 | A1 | 7/2020 |
| WO | 2020187066 | A1 | 9/2020 |

* cited by examiner

*Primary Examiner* — Raymond R Chai

(57) ABSTRACT

A foldable electronic device having a primary screen portion with a primary-screen antenna, and a secondary screen portion with a secondary-screen antenna. Positions of the primary-screen antenna and the secondary-screen antenna overlap when the electronic device is folded. The primary-screen antenna and the secondary-screen antenna may excite two antenna patterns of high isolation. In this way, even if the primary-screen antenna and the secondary-screen antenna operate on a same frequency band and overlap, good isolation performance can also be obtained.

20 Claims, 28 Drawing Sheets

ANTENNA APPARATUS AND ELECTRONIC DEVICE

CROSS-REFERENCE TO RELATED APPLICATIONS

This application is a National Stage of International Application No. PCT/CN2021/142660, filed on Dec. 29, 2021, which claims priority to Chinese Patent Application No. 202011628760.9, filed on Dec. 30, 2020, both of which are hereby incorporated by reference in their entireties.

TECHNICAL FIELD

The present invention relates to the field of antenna technologies, and in particular, to an antenna apparatus and an electronic device.

BACKGROUND

With the development of mobile communication technologies and popularization of smartphones, a smartphone design evolves from a large screen, a bezel-less screen, a rotatable screen, or the like to a foldable screen, to achieve better user experience and novel appearance and functions. A foldable screen of an electronic device such as a smartphone provides a new possibility for a function design of the electronic device, and can be applied to more new application scenarios. In addition, the foldable screen also brings new challenges to and provides new possibilities for an antenna design of the electronic device.

SUMMARY

Embodiments of the present invention provide an antenna apparatus. When an electronic device such as a mobile phone is in a folded state, a primary-screen antenna and a secondary-screen antenna at overlapping positions of a primary screen portion and a secondary screen portion can have complementary performance and be highly isolated from each other. Space utilization of an antenna design is high.

According to a first aspect, this application provides an electronic device. The electronic device may include a first device body, a second device body, and a rotating shaft, where the first device body and the second device body are connected through the rotating shaft, and the electronic device is foldable at the rotating shaft.

The electronic device may further include a first antenna disposed on the first device body and a second antenna disposed on the second device body, where the first antenna and the second antenna at least partially overlap when the electronic device is in a folded state.

The first antenna may include a strip-shaped first conductor and a first feed point disposed on the first conductor, where two ends of the first conductor are open, and the first feed point is connected to a feed source. A distance from the first feed point to a middle position of the first conductor may be greater than or equal to zero and less than 1/16 of an operating wavelength of the first antenna, or a distance from the first feed point to one of the open ends of the first conductor may be greater than or equal to zero and less than 1/16 of an operating wavelength of the first antenna.

The second antenna may include a strip-shaped second conductor, and a second feed point and a grounding stub that are disposed on the second conductor, where two ends of the second conductor are open, the second feed point is connected to a feed source, and the grounding stub is connected to the second conductor and grounded in a middle position of the second conductor. A distance from the second feed point to a connection point for the second conductor and the grounding stub is greater than zero and less than 1/8 of an operating wavelength of the second antenna, or a distance from the second feed point to one of the open ends of the second conductor is greater than or equal to zero and less than 1/8 of an operating wavelength of the second antenna.

That the first antenna and the second antenna at least partially overlap may include: a projection of the first antenna and a projection of the second antenna partially or fully overlap on a plane on which the first device body is located or a plane on which the second device body is located. In other words, when the electronic device is in the folded state, a projection that is of the first antenna and that is on the plane on which the second device body is located partially or fully overlaps with the second antenna. Alternatively, when the electronic device is in the folded state, a projection that is of the second antenna and that is on the plane on which the first device body is located partially or fully overlaps with the first antenna. The overlap is not an overlap that occurs because a projection and an antenna intersect (for example, the projection and the antenna are perpendicular), but mainly is an overlap that occurs because the first conductor and the second conductor are parallel or aligned.

The connection point for the second conductor and the grounding stub may be any point, such as a center point, in a connection area (which may also be referred to as a connection position) between the grounding stub and the second conductor. The first feed point and the second feed point each may be any point, such as a center point, in a connection area (which may also be referred to as a connection position) between a feeder and a conductor.

According to the electronic device provided in the first aspect, currents on the first conductor of the first antenna may be codirectionally distributed, and a DM wire antenna pattern shown in FIG. 4A and FIG. 4B is excited. A polarization direction may be basically perpendicular to an extension direction of the first conductor. Currents on the second conductor of the secondary-screen antenna may be symmetrically and reversely distributed, and a CM wire antenna pattern shown in FIG. 3A and FIG. 3B is excited. A polarization direction may be basically the same as an extension direction of the second conductor. In this way, polarization directions of the first antenna and the second antenna are orthogonal, and isolation performance is high. Even if the first antenna and the second antenna operate on a same frequency, good isolation performance can also be obtained, and radiation patterns of the first antenna and the second antenna are complementary. This is especially beneficial to a MIMO antenna design of an electronic device having a foldable screen.

According to the first aspect, the first device body and the second device body may be respectively a primary screen portion 11-1 and a secondary screen portion 11-3 that are shown in FIG. 1A to FIG. 1C. The first antenna and the second antenna may be respectively a primary-screen antenna and a secondary-screen antenna that are shown in FIG. 7A. For example, the first conductor may be a conductor 21-A, and the first feed point may be a feed point 23. The second conductor may be a conductor 21-B, the second feed point may be a feed point 24, and the grounding stub may be a grounding stub 25. Alternatively, the first antenna and the second antenna may be respectively a primary-screen antenna and a secondary-screen antenna that are shown in FIG. 8A and FIG. 8B. For example, the first conductor may be a suspended metal bezel 41-B, and the first feed point may be a feed point 33-B. The second conductor may be a suspended metal bezel 41-A, the second feed point may be a feed point 33-A, and the grounding stub may be a grounding stub 32.

According to the first aspect, the electronic device may further include a bezel of the first device body and a PCB ground of the first device body. The first antenna may be implemented in the electronic device in the following manner: The first conductor may be a strip-shaped conductor disposed on the bezel of the first device body, the first conductor may be separated from the PCB ground of the first device body by a first slot (clearance), the first slot (such as a slot 31-B in FIG. 8A) is formed by hollowing out the PCB ground of the first device body, and the first slot may be adjacent to the first conductor.

A bezel of a first screen may be a metal bezel. In this case, the first conductor may be a metal bezel segment whose two ends are open and that is formed by opening a gap on the metal bezel. The first conductor is not grounded. A length of the first slot is greater than a length of the metal bezel segment (such as the suspended metal bezel 41-A). To be specific, a slot longer than the metal bezel segment is formed across gaps, such as two gaps 35-A and 35-B, at the two ends of the metal bezel segment and along an extension direction of the metal bezel. In this way, the metal bezel segment forms a suspended metal bezel whose two ends are open, and therefore forms a wire antenna radiator.

Alternatively, the bezel of the first screen may be a non-metal bezel. In this case, the first conductor is a strip-shaped conductor printed or pasted on an inner side of the metal bezel.

According to the first aspect, the electronic device may further include a bezel of the second device body and a PCB ground of the second device body. The second conductor may be a strip-shaped conductor disposed on the bezel of the second device body, the second conductor and the PCB ground of the second device body may be separated by a second slot (clearance) and connected through the grounding stub, the second slot (such as a slot 31-A in FIG. 8A) may be formed by hollowing out the PCB ground of the second device body, and the second slot may be adjacent to the second conductor.

A bezel of a second screen may be a metal bezel. In this case, the second conductor may be a suspended metal bezel segment that is formed by opening a gap on the metal bezel. The bezel of the second screen may be a non-metal bezel. In this case, the second conductor may be a strip-shaped conductor printed or pasted on an inner side of the metal bezel.

According to the first aspect, the grounding stub of the second antenna may be a strip-shaped ground portion that is formed by hollowing out the PCB ground of the second device body and that is connected to the second conductor, or may be a metal elastic piece that is disposed on the PCB ground of the second device body and that is connected to the second conductor, or may be a conductive stub that extends from the second conductor and that is connected to the PCB ground.

Antennas on the foldable screen in the first aspect may be further transformed. To be specific, the second antenna may be transformed from a CM wire antenna to an inverted F antenna (IFA), and operate in a ¼ wavelength mode. The second antenna that is transformed into the IFA may include a strip-shaped second conductor, and a second feed point and a grounding stub that are disposed on the second conductor, where the grounding stub is connected to the second conductor and grounded at one end of the second conductor, and the second feed point is connected to a feed source. A distance from the second feed point to a connection point for the second conductor and the grounding stub may be greater than zero and less than ⅛ of an operating wavelength of the second antenna, or a distance from the second feed point to an open end of the second conductor may be greater than or equal to zero and less than ⅛ of an operating wavelength of the second antenna. For specific implementation of the second conductor and the grounding stub, reference may be made to the foregoing content. Details are not described herein.

According to a second aspect, this application provides an electronic device. The electronic device may include a first device body, a second device body, and a rotating shaft, where the first device body and the second device body are connected through the rotating shaft, and the electronic device is foldable at the rotating shaft.

The electronic device may further include a first antenna disposed on the first device body and a second antenna disposed on the second device body, where the first antenna and the second antenna at least partially overlap when the electronic device is in a folded state.

The first antenna may include a strip-shaped first conductor and a first feed point disposed on the first conductor, where two ends of the first conductor are open, and the first feed point is connected to a feed source. A distance from the first feed point to a middle position of the first conductor may be greater than or equal to zero and less than 1/16 of an operating wavelength of the first antenna, or a distance from the first feed point to one of the open ends of the first conductor may be greater than or equal to zero and less than 1/16 of an operating wavelength of the first antenna.

The second antenna may include a second conductor provided with a first slot, two ends of the first slot are closed and grounded, and a first side of the first slot is provided with a first gap. A distance from the first gap to a middle position on the first side may be less than 1/16 of an operating wavelength of the second antenna, a second feed point is disposed on the first side of the first slot, a second feed point is connected to a feed source, and a distance from the second feed point to the first gap may be greater than zero and less than ⅛ of the operating wavelength of the second antenna.

That the first antenna and the second antenna at least partially overlap may include: a projection of the first antenna and a projection of the second antenna partially or fully overlap on a plane on which the first device body is located or a plane on which the second device body is located. In other words, when the electronic device is in the folded state, a projection that is of the first antenna and that is on the plane on which the second device body is located partially or fully overlaps with the second antenna. Alternatively, when the electronic device is in the folded state, a projection that is of the second antenna and that is on the plane on which the first device body is located partially or fully overlaps with the first antenna. The overlap is not an overlap that occurs because a projection and an antenna intersect (for example, the projection and the antenna are perpendicular), but mainly is an overlap that occurs because the first conductor and the second conductor are parallel or aligned.

The first feed point and the second feed point each may be any point, such as a center point, in a connection area (which may also be referred to as a connection position) between a feeder and a conductor. The distance from the first gap to the middle position on the first side may be a distance from a midpoint of the first gap to a midpoint on the first side, or may be a distance from two ends of the first gap to the midpoint on the first side. The distance from the second feed point to the first gap may be a distance from the second feed point to a midpoint of the first gap, or may be a distance from the second feed point to two ends of the first gap.

According to the electronic device provided in the second aspect, currents on the first conductor of the first antenna may be codirectionally distributed, and a DM wire antenna pattern shown in FIG. 4A and FIG. 4B is excited. A polarization direction may be basically perpendicular to an extension direction of the first conductor. Electric fields in the slot of the second conductor of the secondary-screen antenna may be symmetrically and reversely distributed, and a CM slot antenna pattern shown in FIG. 5A and FIG. 5B is excited. A polarization direction may be basically the same as an extension direction of the slot. In this way, polarization directions of the first antenna and the second antenna are orthogonal, and isolation performance is high. Even if the first antenna and the second antenna operate on a same frequency, good isolation performance can also be obtained, and radiation patterns of the first antenna and the second antenna are complementary. This is especially beneficial to a MIMO antenna design of an electronic device having a foldable screen.

According to the second aspect, the first device body and the second device body may be respectively a primary screen portion 11-1 and a secondary screen portion 11-3 that are shown in FIG. 1A to FIG. 1C. The first antenna and the second antenna may be respectively a primary-screen antenna and a secondary-screen antenna that are shown in FIG. 7B. For example, the first conductor may be a conductor 21-A, and the first feed point may be a feed point 23. The second conductor may be a conductor 21-C, the first slot may be a slot 26, the second feed point may be a feed point 27, and the first gap may be a gap 28. Alternatively, the first antenna and the second antenna may be respectively a primary-screen antenna and a secondary-screen antenna that are shown in FIG. 11A and FIG. 11B. For example, the first conductor may be a suspended metal bezel 61-B, and the first feed point may be a feed point 63-B. The second conductor may be a conductor that includes a PCB ground and a metal bezel that are on a primary screen portion and that enclose to form a slot 62-A, the first slot may be the slot 62-A, the second feed point may be a feed point 63-A, and the first gap may be a gap 67.

According to the second aspect, the electronic device may further include a bezel of the first device body and a PCB ground of the first device body. The first conductor may be a strip-shaped conductor disposed on the bezel of the first device body, the first conductor may be separated from the PCB ground of the first device body by a second slot (clearance), the second slot (such as a slot 62-B in FIG. 11A) may be formed by hollowing out the PCB ground of the first device body, and the second slot is adjacent to the first conductor.

A bezel of a first screen may be a metal bezel. In this case, the first conductor may be a metal bezel segment whose two ends are open and that is formed by opening a gap on the metal bezel. The first conductor is not grounded. A length of the second slot is greater than a length of the metal bezel segment (such as the suspended metal bezel 61-B in FIG. 11A). To be specific, a slot longer than the metal bezel segment is formed along an extension direction of the metal bezel and across gaps, such as two gaps 66-A and 66-B, at the two ends of the metal bezel segment. In this way, the metal bezel segment forms a suspended metal bezel whose two ends are open, and therefore forms a wire antenna radiator.

Alternatively, the bezel of the first screen may be a non-metal bezel. In this case, the first conductor is a strip-shaped conductor printed or pasted on an inner side of the metal bezel.

According to the second aspect, the electronic device may further include a metal bezel of the second device body and a PCB ground of the second device body. The second conductor may include the metal bezel of the second device body and the PCB ground of the second device body that enclose to form the first slot (such as the slot 62-A in FIG. 11A). The first slot may be formed by hollowing out the PCB ground of the second device body, the first slot may be adjacent to the metal bezel of the second device body, and the first gap may be a gap provided on the metal bezel that is of the second device body and adjacent to the first slot and that forms a first side of the first slot. The first gap is provided on the metal bezel on one side of the second feed point, and no gap is provided on the metal bezel on the other side of the second feed point.

According to a third aspect, this application provides an electronic device. The electronic device may include a first device body, a second device body, and a rotating shaft, where the first device body and the second device body are connected through the rotating shaft, and the electronic device is foldable at the rotating shaft.

The electronic device may further include a first antenna disposed on the first device body and a second antenna disposed on the second device body, where the first antenna and the second antenna at least partially overlap when the electronic device is in a folded state.

The first antenna may include a strip-shaped first conductor, and a first feed point and a grounding stub that are disposed on the first conductor, where two ends of the first conductor are open, and the first feed point is connected to a feed source. The grounding stub is connected to the first conductor and grounded in a middle position of the first conductor, and a distance from the first feed point to a connection point for the first conductor and the grounding stub may be greater than zero and less than ⅛ of an operating wavelength of the first antenna, or a distance from the first feed point to one of the open ends of the first conductor may be greater than or equal to zero and less than ⅛ of an operating wavelength of the first antenna.

The second antenna may include a second conductor provided with a first slot, two ends of the first slot are closed and grounded, a second feed point is disposed on a first side of the first slot, and the second feed point is connected to a feed source. A distance from the second feed point to a middle position on the first side of the first slot may be greater than or equal to zero and less than 1/16 of an operating wavelength of the second antenna.

That the first antenna and the second antenna at least partially overlap may include: a projection of the first antenna and a projection of the second antenna partially or fully overlap on a plane on which the first device body is located or a plane on which the second device body is located. In other words, when the electronic device is in the folded state, a projection that is of the first antenna and that is on the plane on which the second device body is located partially or fully overlaps with the second antenna. Alternatively, when the electronic device is in the folded state, a projection that is of the second antenna and that is on the plane on which the first device body is located partially or fully overlaps with the first antenna. The overlap is not an overlap that occurs because a projection and an antenna intersect (for example, the projection and the antenna are perpendicular), but mainly is an overlap that occurs because the first conductor and the second conductor are parallel or aligned.

The connection point for the first conductor and the grounding stub may be any point, such as a center point, in a connection area (which may also be referred to as a connection position) between the grounding stub and the first conductor. The first feed point and the second feed point each may be any point, such as a center point, in a connection area (which may also be referred to as a connection position) between a feeder and a conductor.

According to the electronic device provided in the third aspect, currents on the first conductor of the first antenna may be reversely distributed, and a CM wire antenna pattern shown in FIG. 3A and FIG. 3B is excited. A polarization direction may be basically the same as an extension direction of the first conductor. Electric fields in the slot of the second conductor of the secondary-screen antenna may be codirectionally distributed, and a DM slot antenna pattern shown in FIG. 6A and FIG. 6B is excited. A polarization direction may be basically perpendicular to an extension direction of the slot. In this way, polarization directions of the first antenna and the second antenna are orthogonal, and isolation performance is high. Even if the first antenna and the second antenna operate on a same frequency, good isolation performance can also be obtained, and radiation patterns of the first antenna and the second antenna are complementary. This is especially beneficial to a MIMO antenna design of an electronic device having a foldable screen.

According to the third aspect, the first device body and the second device body may be respectively a primary screen portion 11-1 and a secondary screen portion 11-3 that are shown in FIG. 1A to FIG. 1C. The first antenna and the second antenna may be respectively a primary-screen antenna and a secondary-screen antenna that are shown in FIG. 7C. For example, the first conductor may be a conductor 21-B, and the first feed point may be a feed point 24. The second conductor may be a conductor 21-D, the first slot may be a slot 32, and the second feed point may be a feed point 31. Alternatively, the first antenna and the second antenna may be respectively a primary-screen antenna and a secondary-screen antenna that are shown in FIG. 10A and FIG. 10B. For example, the first conductor may be a suspended metal bezel 51-A, and the first feed point may be a feed point 53-A. The second conductor may include a PCB ground and a metal bezel that are on a primary screen portion and that enclose to form a slot 52-B, the first slot may be the slot 52-B, and the second feed point may be a feed point 53-B.

According to the third aspect, the electronic device may further include a bezel of the first device body and a PCB ground of the first device body. The first conductor may be a strip-shaped conductor disposed on the bezel of the first device body, the first conductor and the PCB ground of the first device body may be separated by a second slot (clearance) and connected through the grounding stub, the second slot (such as a slot 52-A in FIG. 10A) may be formed by hollowing out the PCB ground of the first device body, and the second slot may be adjacent to the first conductor.

A bezel of a first screen may be a metal bezel. In this case, the first conductor may be a metal bezel segment whose two ends are open and that is formed by opening a gap on the metal bezel. A length of the second slot is greater than a length of the metal bezel segment (such as the suspended metal bezel 51-A in FIG. 10A). To be specific, a slot longer than the metal bezel segment is formed along an extension direction of the metal bezel and across gaps, such as two gaps 55-A and 55-B, at the two ends of the metal bezel segment. In this way, the metal bezel segment forms a suspended metal bezel whose two ends are open, and therefore forms a wire antenna radiator.

Alternatively, the bezel of the first screen may be a non-metal bezel. In this case, the first conductor is a strip-shaped conductor printed or pasted on an inner side of the metal bezel.

The grounding stub of the first antenna may be a strip-shaped ground portion that is formed by hollowing out the PCB ground of the first device body and that is connected to the first conductor, or the grounding stub is a metal elastic piece that is disposed on the PCB ground of the first device body and that is connected to the first conductor, or the grounding stub is a conductive stub that extends from the first conductor and that is connected to the PCB ground.

According to the third aspect, the electronic device may further include a metal bezel of the second device body and a PCB ground of the second device body. The second conductor may include the metal bezel of the second device body and the PCB ground of the second device body that enclose to form the first slot (such as the 52-B in FIG. 10A), the first slot may be formed by hollowing out the PCB ground of the second device body, and the first slot may be adjacent to the metal bezel of the second device body. No gap is provided on the metal bezel that is of the second device body and adjacent to the first slot and that forms a first side of the first slot.

According to a fourth aspect, this application provides an electronic device. The electronic device may include a first device body, a second device body, and a rotating shaft, where the first device body and the second device body are connected through the rotating shaft, and the electronic device is foldable at the rotating shaft.

The electronic device may further include a first antenna disposed on the first device body and a second antenna disposed on the second device body, where the first antenna and the second antenna at least partially overlap when the electronic device is in a folded state.

The first antenna may include a first conductor provided with a first slot, two ends of the first slot are closed and grounded, and a first side of the first slot is provided with a gap. A distance from the first gap to a middle position on the first side may be less than 1/16 of an operating wavelength of the second antenna, a first feed point is disposed on the first side of the first slot, the first feed point is connected to a feed source, and a distance from the first feed point to the first gap may be greater than zero and less than 1/8 of the operating wavelength of the first antenna.

The second antenna may include a second conductor provided with a second slot, two ends of the second slot are closed and grounded, a second feed point is disposed on a second side of the second slot, and the second feed point is connected to a feed source. A distance from the second feed point to a middle position on the second side of the second slot may be greater than or equal to zero and less than 1/16 of an operating wavelength of the second antenna.

That the first antenna and the second antenna at least partially overlap may include: a projection of the first antenna and a projection of the second antenna partially or fully overlap on a plane on which the first device body is located or a plane on which the second device body is located. In other words, when the electronic device is in the folded state, a projection that is of the first antenna and that is on the plane on which the second device body is located partially or fully overlaps with the second antenna. Alternatively, when the electronic device is in the folded state, a projection that is of the second antenna and that is on the plane on which the first device body is located partially or fully overlaps with the first antenna. The overlap is not an overlap that occurs because a projection and an antenna intersect (for example, the projection and the antenna are perpendicular), but mainly is an overlap that occurs because the first conductor and the second conductor are parallel or aligned.

The first feed point and the second feed point each may be any point, such as a center point, in a connection area (which may also be referred to as a connection position) between a feeder and a conductor. The distance from the first gap to the middle position on the first side may be a distance from a midpoint of the first gap to a midpoint on the first side, or may be a distance from two ends of the first gap to the midpoint on the first side. The distance from the second feed point to the first gap may be a distance from the second feed point to a midpoint of the first gap, or may be a distance from the second feed point to two ends of the first gap.

According to the electronic device provided in the fourth aspect, electric fields in the slot of the first conductor of the first antenna may be symmetrically and reversely distributed, and a CM slot antenna pattern shown in FIG. 5A and FIG. 5B is excited. A polarization direction may be basically the same as an extension direction of the slot of the first conductor. Electric fields in the slot of the second conductor of the secondary-screen antenna may be codirectionally distributed, and a DM slot antenna pattern shown in FIG. 6A and FIG. 6B is excited. A polarization direction may be basically perpendicular to an extension direction of the slot. In this way, polarization directions of the first antenna and the second antenna are orthogonal, and isolation performance is high. Even if the first antenna and the second antenna operate on a same frequency, good isolation performance can also be obtained, and radiation patterns of the first antenna and the second antenna are complementary. This is especially beneficial to a MIMO antenna design of an electronic device having a foldable screen.

According to the fourth aspect, the electronic device may further include a metal bezel of the first device body and a PCB ground of the first device body. The first conductor includes the metal bezel of the first device body and the PCB ground of the first device body that enclose to form the first slot (such as a slot 72-A in FIG. 12A), the first slot is formed by hollowing out the PCB ground of the first device body, and the first slot is adjacent to the metal bezel of the first device body. No gap is provided on the metal bezel that is of the first device body and adjacent to the first slot and that forms a first side of the first slot.

According to the fourth aspect, the electronic device may further include a metal bezel of the second device body and a PCB ground of the second device body. The second conductor includes the metal bezel of the second device body and the PCB ground of the second device body that enclose to form the second slot (such as a slot 72-B in FIG. 12A), the second slot is formed by hollowing out the PCB ground of the second device body, the second slot is adjacent to the metal bezel of the second device body, the first gap (such as a gap 79 in FIG. 12A) may be a gap provided on the metal bezel that is of the second device body and adjacent to the second slot and that forms the first side of the first slot. The first gap is provided on the metal bezel on one side of the second feed point, and no gap is provided on the metal bezel on the other side of the second feed point.

BRIEF DESCRIPTION OF DRAWINGS

To describe technical solutions in embodiments of this application more clearly, the following describes the accompanying drawings used in embodiments of this application.

DESCRIPTION OF EMBODIMENTS

The following describes embodiments of the present invention with reference to the accompanying drawings in embodiments of the present invention.

The technical solutions provided in this application are applicable to an electronic device that uses one or more of the following communication technologies: a global system for mobile communication (global system for mobile communication, GSM) technology, a code division multiple access (code division multiple access, CDMA) communication technology, a wideband code division multiple access (wideband code division multiple access, WCDMA) communication technology, a general packet radio service (general packet radio service, GPRS), a long term evolution (long term evolution, LTE) communication technology, a Wi-Fi communication technology, a 5G communication technology, a millimeter wave (mmWave) communication technology, a sub-6G communication technology, another future communication technology, and the like. The following embodiments describe an operating characteristic of an antenna based on a frequency band instead of a requirement of a communication network. In this application, the electronic device may be an electronic device such as a mobile phone, a tablet, or a personal digital assistant (personal digital assistant, PDA).

Figure 1A:
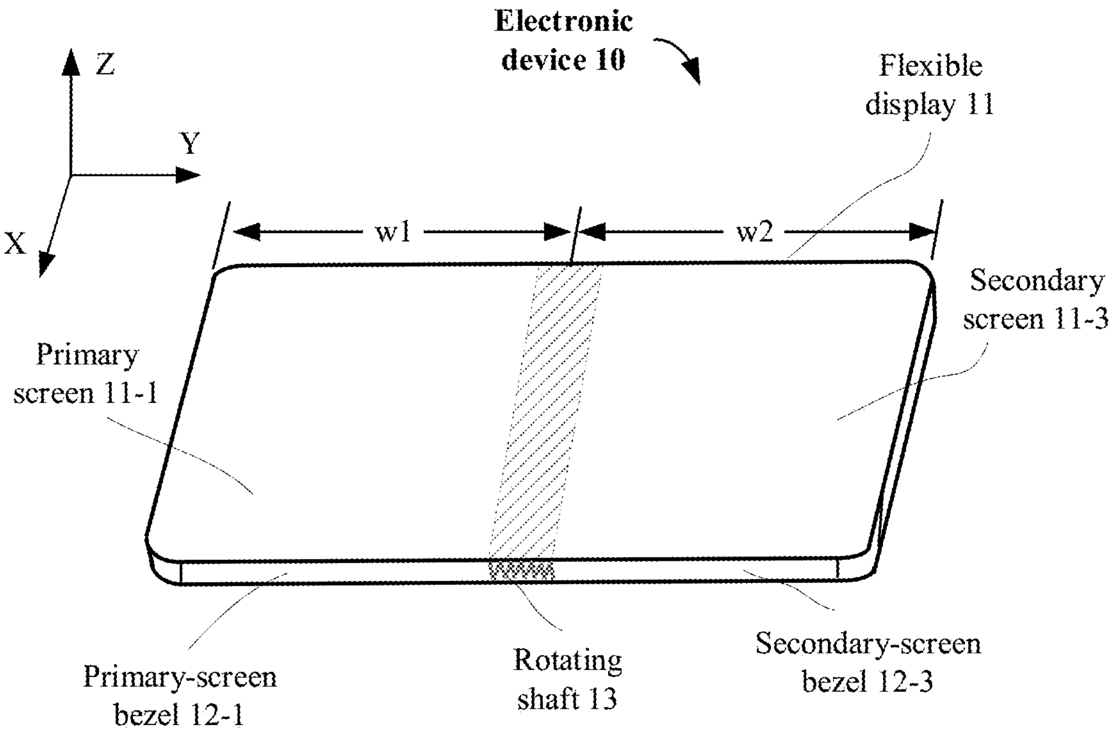
FIG. 1A to FIG. 1C are schematic diagrams depicting a structure of an electronic device according to an embodiment of this application.

FIG. 1A shows an example electronic device on which an antenna design solution provided in this application is based. As shown in FIG. 1A, the electronic device may include a foldable screen 11, a rotating shaft 13, and a bezel. The foldable screen 11 may include a primary screen portion 11-1 and one or more secondary screen portions 11-3. Therefore, the electronic device may be divided into a device body having a primary screen (which is briefly referred to as the primary screen portion below) and a device body having a secondary screen (which is briefly referred to as the secondary screen portion below). To simplify the accompanying drawings, only one secondary screen portion 11-3 is shown in the accompanying drawings. The rotating shaft 13 connects a first device body and a second device body. A width (w1) of the primary screen portion may be the same as or different from a width (w2) of the secondary screen portion. The bezel of the electronic device may include a primary-screen bezel 12-1 and a secondary-screen bezel 12-3. The primary-screen bezel 12-1 surrounds the primary screen portion 11-1, and the secondary-screen bezel 12-3 surrounds the secondary screen portion 11-3. The bezel may be a metal bezel or a non-metal bezel (such as a plastic bezel or a glass bezel).

Figure 1B:
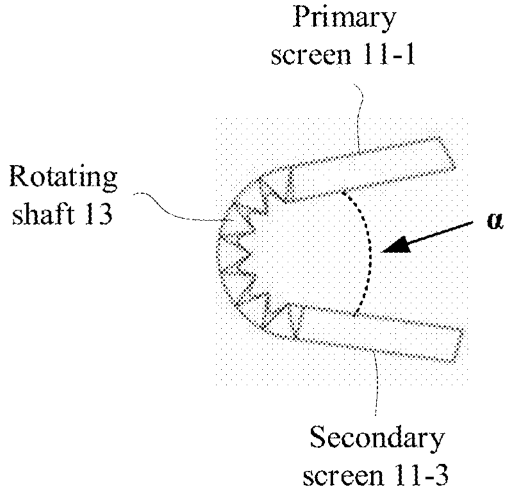

As shown in FIG. 1B, the electronic device may be bent at the rotating shaft 13. To be specific, the electronic device may be bent outwardly or inwardly. After the electronic device is bent outwardly, the foldable screen 11 is presented outside, a rear cover of the electronic device is hidden inside, and display content on the foldable screen 11 is visible to a user. After the electronic device is bent inwardly, the foldable screen 11 is hidden inside, the rear cover of the electronic device is presented outside, and the display content on the foldable screen 11 is invisible to the user. The electronic device has two modes: an open (open) state and a folded (folded) state. In the open state, an included angle α between the primary screen and the secondary screen exceeds a first angle (such as 120°), and the included angle α may even be equal to or close to 180°. In the folded state, the included angle α between the primary screen and the secondary screen is less than a second angle (such as 15°), and the included angle α may even be equal to or close to 0°. When the foldable screen 11 is in the open state, the electronic device may be shown as an example in FIG. 1A. When the foldable screen 11 is in the folded state, the electronic device may be shown as an example in FIG. 1C.

The electronic device may further include a printed circuit board (printed circuit board, PCB), a housing (housing), and the like that are not shown. The housing is mainly used to support the entire device. A metal layer may be disposed on a side of the PCB, and the metal layer may be formed by etching metal on a surface of the PCB. The metal layer may be used to ground an electronic component carried on the PCB, to prevent a user from an electric shock or prevent device damage. The metal layer may be referred to as a PCB ground, and includes a primary-screen PCB ground and a secondary-screen PCB ground. In addition to the PCB ground, the electronic device may further include another ground for grounding, for example, a metal middle frame.

Figure 2A:
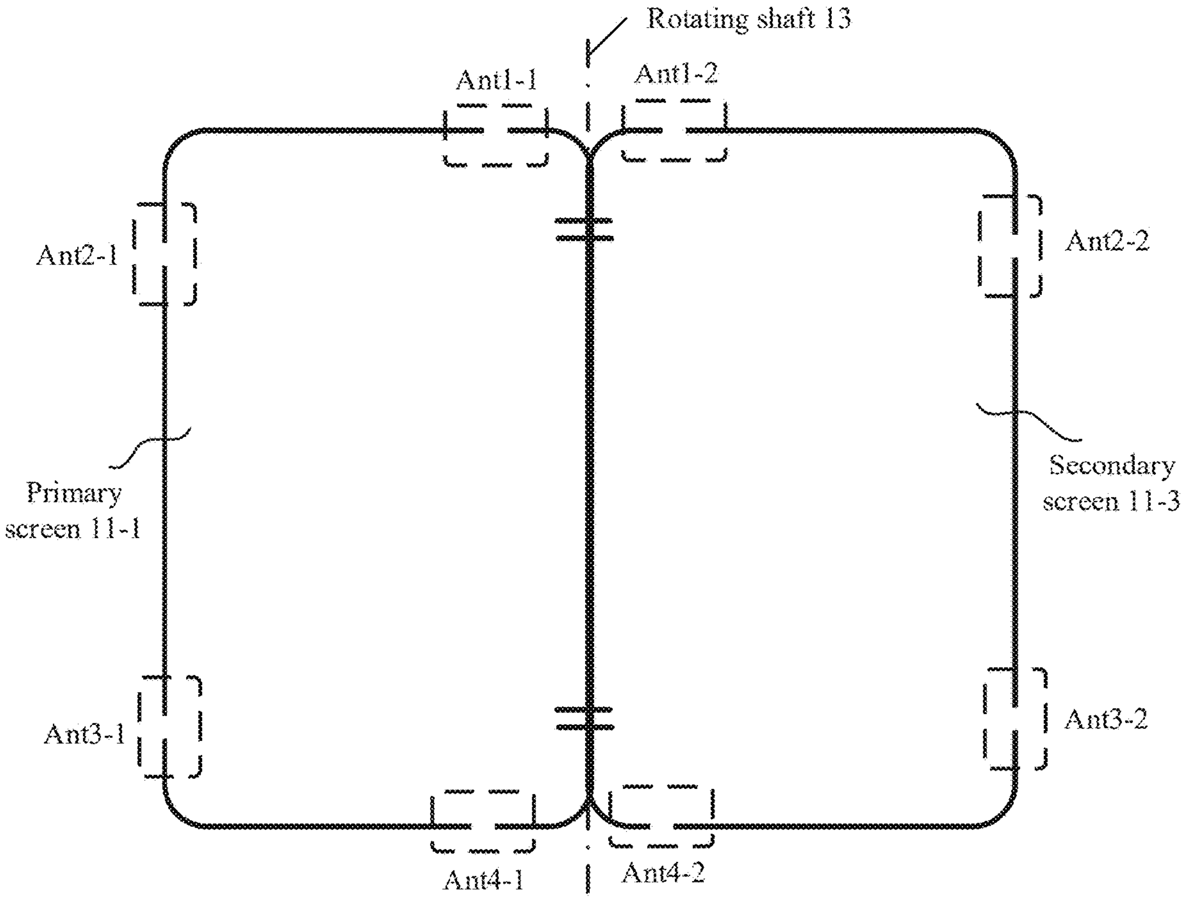
FIG. 2A and FIG. 2B are schematic diagrams of design positions of a primary-screen antenna and a secondary-screen antenna according to this application.

An embodiment of this application provides an antenna design solution. As shown in FIG. 2A, a primary screen portion of an electronic device is designed with a primary-screen antenna such as a primary-screen antenna Ant1-1, and a secondary screen portion of the electronic device is designed with a secondary-screen antenna such as a secondary-screen antenna Ant1-2. The primary-screen antenna and the secondary-screen antenna may be antennas that operate on a same frequency band. When the electronic device is in a folded state, positions of the primary-screen antenna and the secondary-screen antenna overlap, for example, partially or fully overlap. An overlap herein may mean that a projection, of the primary-screen antenna, on a plane on which the secondary screen portion is located overlaps with the secondary-screen antenna when the electronic device is in the folded state; or a projection, of the secondary-screen antenna, on a plane on which the primary screen portion is located overlaps with the primary-screen antenna when the electronic device is in the folded state. The overlap is not an overlap that occurs because a projection and an antenna intersect (for example, the projection and the antenna are perpendicular), but mainly is an overlap that occurs because radiators of the primary-screen antenna and the secondary-screen antenna are parallel or aligned. The primary-screen antenna and the secondary-screen antenna may excite two antenna patterns of high isolation, such as a common-mode antenna pattern and a differential-mode antenna pattern that are introduced later. For example, a polarization direction of the primary-screen antenna Ant1-1 is an extension direction of a top bezel, and a polarization direction of the secondary-screen antenna Ant1-2 is a direction perpendicular to the extension direction of the top bezel. In other words, polarization directions of the primary-screen antenna Ant1-1 and the secondary-screen antenna Ant1-2 are fully or approximately orthogonal. In this way, even if the primary-screen antenna and the secondary-screen antenna operate on a same frequency band and overlap, good isolation performance can also be obtained, and radiation patterns of the primary-screen antenna and the secondary-screen antenna are complementary. This is especially beneficial to a MIMO antenna design of an electronic device having a foldable screen. In addition, two or more antennas that operate on a same frequency band can be highly isolated from each other without isolating a plurality of antennas that operate on a same frequency band at physical positions. For example, the primary-screen antenna Ant1-1 and the secondary-screen antenna Ant1-2 do not need to be staggered at physical positions. This fully utilizes an antenna design space of the electronic device having a foldable screen.

Figure 2B:
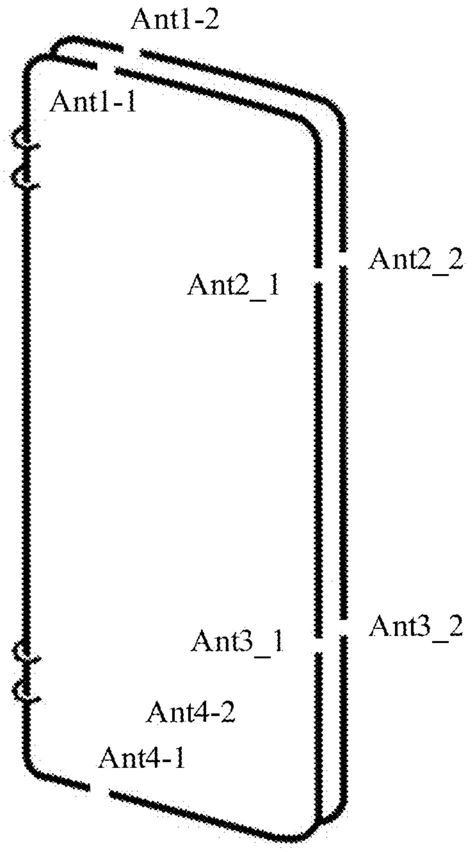

As shown in FIG. 2A and FIG. 2B, an electronic device 10 may be designed with two or more pairs of such primary-screen antennas and secondary-screen antennas, which may cover a plurality of frequency bands and may form a plurality of MIMO antennas that operate on different frequency bands. For example, the primary-screen antenna Ant1-1 and the secondary-screen antenna Ant1-2 may form Wi-Fi MIMO antennas, a primary-screen antenna Ant2-1 and a secondary-screen antenna Ant2-2 may form high-frequency (such as 3.5 GHz) MIMO antennas, and a primary-screen antenna Ant3-1 and a secondary-screen antenna Ant3-2 may form low-frequency (such as 900 MHz) MIMO antennas.

Figure 1C:
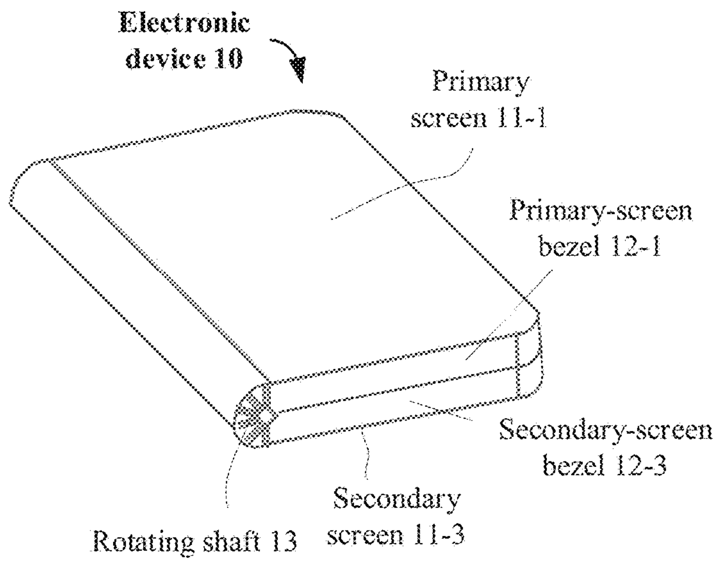

The antenna design solution provided in this embodiment of this application may be applied to an electronic device that is shown as an example in FIG. 1A to FIG. 1C and that has a foldable screen, for example, a mobile phone or a tablet.

First, a common-mode antenna pattern and a differential-mode antenna pattern in embodiments of this application are described.

1. Common-Mode (Common Mode, CM) Wire Antenna Pattern

Figure 3A:
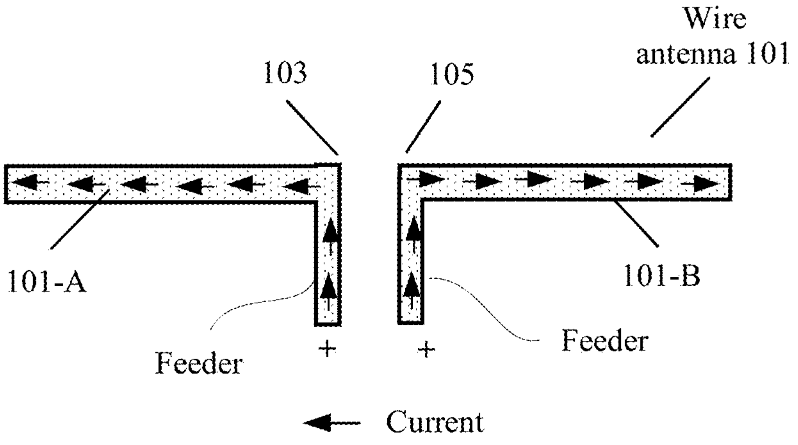
FIG. 3A and FIG. 3B are schematic diagrams depicting a principle of a CM wire antenna according to this application.

As shown in FIG. 3A, a wire antenna 101 may include two radiators: a radiator 101-A and a radiator 101-B. The two radiators are aligned and extend in opposite directions. Two ends (such as an end 103 and an end 105) that are of the radiator 101-A and the radiator 101-B respectively and that are close to each other may be both connected to a positive electrode of a feed source. A phase difference between radio frequency signals fed into the two radiators is 0°.

As shown in FIG. 3A, currents at a feed position are codirectionally distributed, and this type of feeding may be referred to as common-mode feeding. Currents on the wire antenna 101 are reversely distributed. Herein, that the currents are reversely distributed means that directions of excited primary currents are basically reverse. For example, as shown in FIG. 3A, a direction of a primary current on a left half portion of the wire antenna 101 is from right to left, and a direction of a primary current on a right half portion of the wire antenna 101 is from left to right. An antenna pattern excited by the antenna shown in FIG. 3A may be referred to as a CM wire antenna pattern, and the antenna may be referred to as a CM wire antenna. The CM wire antenna pattern may be generated when the two radiators each operate in a ¼ wavelength mode.

Figure 3B:
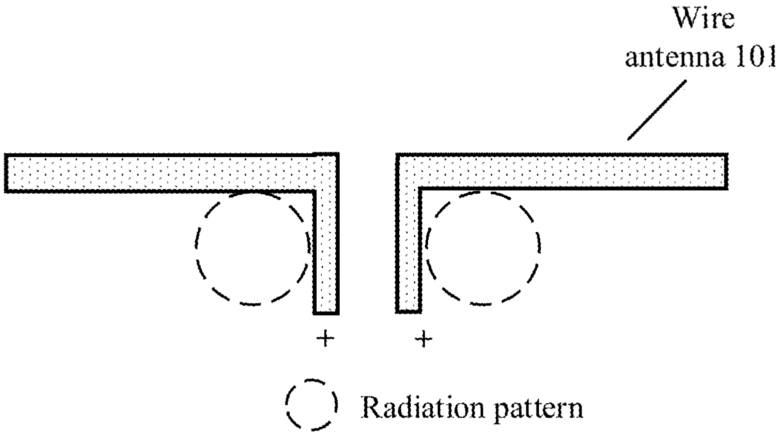

FIG. 3B shows a simplified radiation pattern (radiation pattern) of the wire antenna 101. It can be learned that a radiation direction in the CM wire antenna pattern is the same as an extension direction of the wire antenna 101. In other words, a polarization direction of the wire antenna 101 is the same as an extension direction of the wire antenna 101. Polarization is a radiation characteristic that describes a spatial orientation of a field strength vector of an electromagnetic wave. Generally, a spatial orientation of an electric field vector may be used as a polarization direction of the electromagnetic wave, which may be a spatial orientation of an electric field vector in a maximum radiation direction (a main lobe direction) of an antenna. In actual application, the polarization direction of the wire antenna 101 may not be totally the same as the extension direction of the wire antenna 101. A slight deviation, such as a deviation within 30°, may exist.

2. Differential-Mode (Differential Mode, DM) Wire Antenna Pattern

Figure 4A:
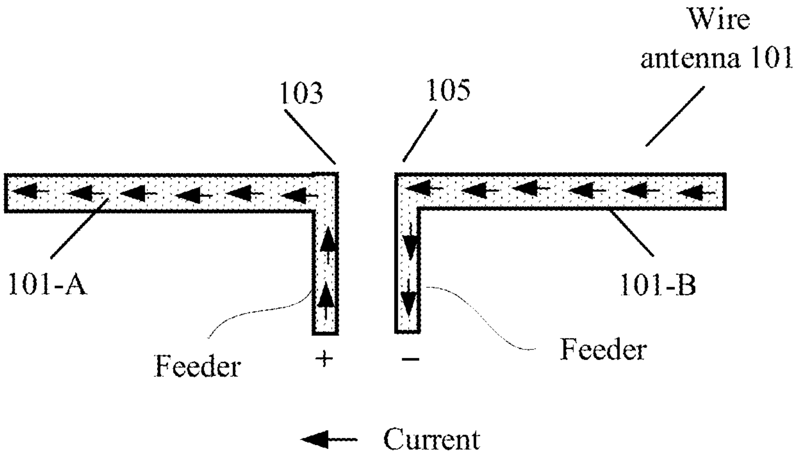
FIG. 4A and FIG. 4B are schematic diagrams depicting a principle of a DM wire antenna according to this application.

As shown in FIG. 4A, a radiator structure of a wire antenna 101 is the same as a radiator structure of the wire antenna 101 shown in FIG. 3A. A difference lies in that two ends (such as an end 103 and an end 105) that are of a radiator 101-A and a radiator 101-B respectively and that are close to each other may be respectively connected to a positive electrode and a negative electrode of a feed source. A phase difference between radio frequency signals fed into the two radiators is 180°.

As shown in FIG. 4A, currents at a feed position are reversely distributed, and this type of feeding may be referred to as differential-mode feeding. Currents on the wire antenna 101 are codirectionally distributed. Herein, that the currents are codirectionally distributed means that directions of excited primary currents are basically the same. For example, as shown in FIG. 4A, directions of primary currents on the wire antenna 101 are from right to left. An antenna pattern excited by the antenna shown in FIG. 4A may be referred to as a DM wire antenna pattern, and the antenna may be referred to as a DM wire antenna. The DM wire antenna pattern may be generated when the entire wire antenna 101 operates in a ½ wavelength mode.

Figure 4B:
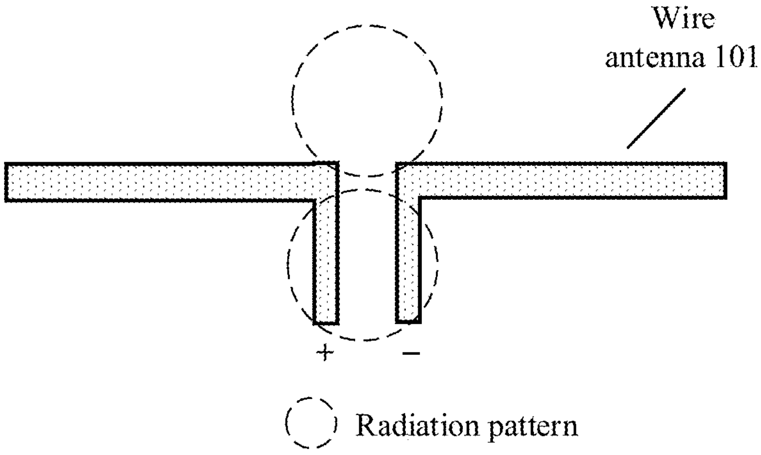

FIG. 4B shows a simplified radiation pattern of the wire antenna 101. It can be learned that a radiation direction in the DM wire antenna pattern is perpendicular to an extension direction of the wire antenna 101. In other words, a polarization direction of the wire antenna 101 is perpendicular to the extension direction of the wire antenna 101. In actual application, the polarization direction of the wire antenna 101 may not be fully perpendicular to the extension direction of the wire antenna 101. A slight deviation, such as a deviation within 30°, may exist to be approximately perpendicular.

3. Common-Mode (Common Mode, CM) Slot Antenna Pattern

Figure 5A:
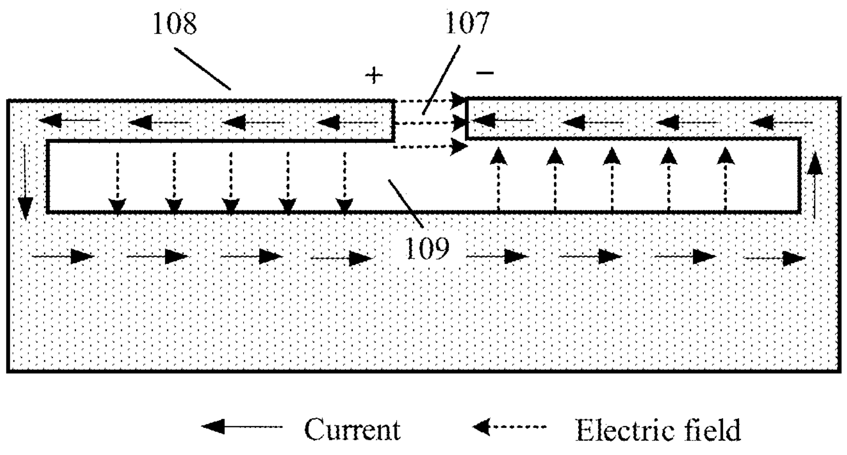
FIG. 5A and FIG. 5B are schematic diagrams depicting a principle of a CM slot antenna according to this application.

As shown in FIG. 5A, a slot antenna 108 may include a slot 109, and a side of the slot 109 is provided with a gap 107. The gap 107 may connect the slot 109 to external free space. The gap 107 may be specifically provided in a middle position of the side. Herein, the middle position refers to a midpoint of the side. In other words, a position of the gap 107 covers the midpoint. A feed source may be connected at the gap 107. For example, radiators at two ends of the gap 107 may be connected to the feed source. Specifically, a radiator at one end of the gap 107 is connected to a positive electrode of the feed source, and a radiator at the other end of the gap 107 is connected to a negative electrode of the feed source.

In the feeding manner shown in FIG. 5A, electric fields at a feed position (namely, the gap 107) are codirectionally distributed, and this type of feeding may be referred to as common-mode feeding. Electric fields in the slot 109 are symmetrically and reversely distributed. Herein, that the electric fields are reversely distributed means that directions of excited primary electric fields are basically reverse. For example, as shown in FIG. 5A, a direction of a primary electric field on a left half portion of the slot 109 is from top to bottom, and a direction of a primary electric field on a right half portion of the slot 109 is from bottom to top. An antenna pattern excited by the antenna shown in FIG. 5A may be referred to as a CM slot antenna pattern, and the antenna may be referred to as a CM slot antenna. The CM slot antenna pattern may be generated when slot portions on two sides of the gap 107 each operate in a ¼ wavelength mode.

Figure 5B:
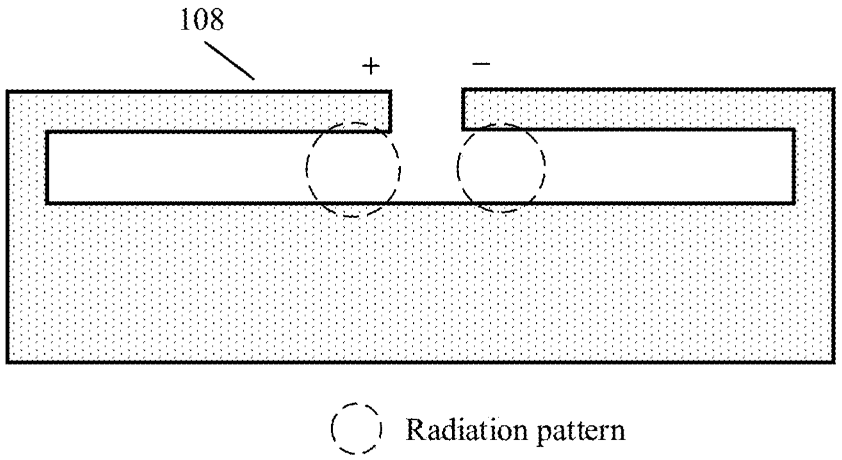

FIG. 5B shows a simplified radiation pattern of the slot antenna 108. It can be learned that a radiation direction in the CM slot antenna pattern is the same as an extension direction of the slot 109. In other words, a polarization direction of the slot antenna 108 is parallel to the extension direction of the slot 109. In actual application, the polarization direction of the slot antenna 108 may not be totally the same as an extension direction of the slot antenna 108. A slight deviation, such as a deviation within 30°, may exist.

4. Differential-Mode (Differential Mode, DM) Slot Antenna Pattern

Figure 6A:
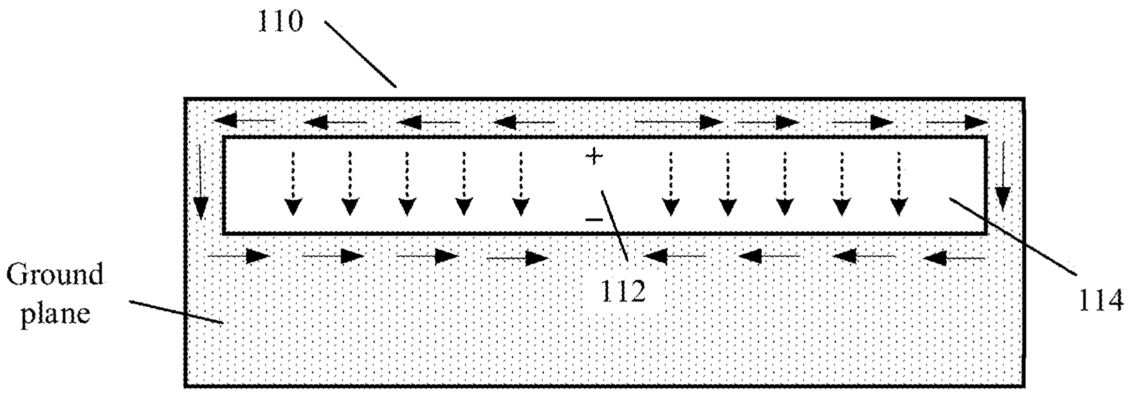
FIG. 6A and FIG. 6B are schematic diagrams depicting a principle of a DM slot antenna according to this application.

As shown in FIG. 6A, a slot antenna 110 may include a slot 114. The slot 114 may be specifically formed on a ground, for example, formed by opening a slot on the ground. A middle position of the slot 114 may be connected to a feed source. For example, radiators on two sides of the middle position of the slot 114 may be connected to the feed source. Herein, that the middle position of the slot 114 is connected to the feed source means that a connection position for a feeder of the feed source and a side (for example, a side formed by a metal bezel) of the slot 114 covers a midpoint of the side. Specifically, a middle position of a radiator on one side of the slot 114 may be connected to a positive electrode of the feed source, and a middle position of a radiator on the other side of the slot 114 may be connected to a negative electrode of the feed source. Herein, that the positive electrode/negative electrode of the feed source is connected to a middle position of a radiator means that a connection position for the positive electrode/negative electrode of the feed source and the radiator covers a midpoint of the radiator.

In the feeding manner shown in FIG. 6A, directions of electric fields at a feed position 112 are reverse, and this type of feeding may be referred to as differential-mode feeding. Electric fields in the slot 114 are symmetrically and codirectionally distributed. Herein, that the electric fields are codirectionally distributed means that directions of excited primary electric fields are basically the same. For example, as shown in FIG. 6A, directions of primary electric fields in the slot 114 are from top to bottom. An antenna pattern excited by the antenna shown in FIG. 6A may be referred to as a DM slot antenna pattern, and the antenna may be referred to as a DM slot antenna. The DM slot antenna pattern may be generated when the entire slot 114 operates in a ½ wavelength mode.

Figure 6B:
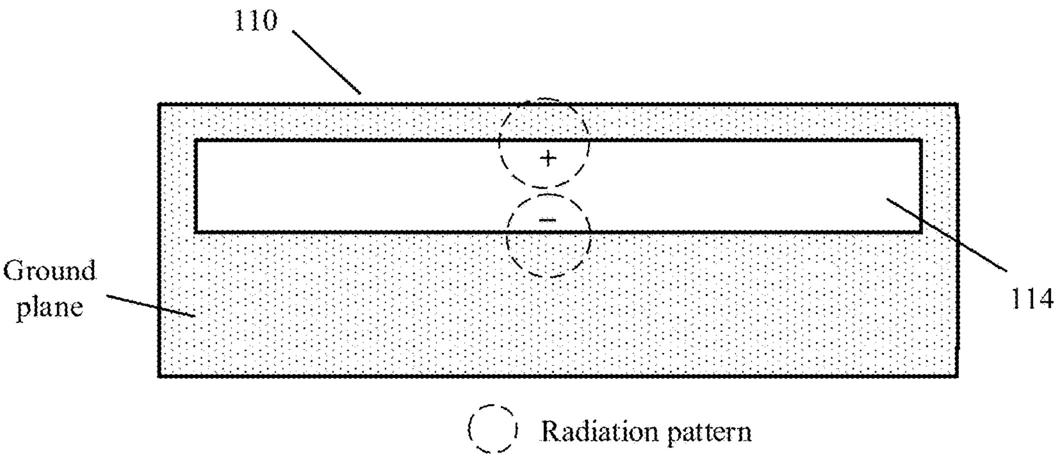

FIG. 6B shows a simplified radiation pattern of the slot antenna 110. It can be learned that a radiation direction in the DM slot antenna pattern is perpendicular to an extension direction of the slot 114. In other words, a polarization direction of the slot antenna 110 is perpendicular to the extension direction of the slot 114. In actual application, the polarization direction of the slot antenna 110 may not be fully perpendicular to the extension direction of the slot 114. A slight deviation, such as a deviation within 30°, may exist to be approximately perpendicular.

In the foregoing antennas, polarization directions of a common-mode antenna and a differential-mode antenna are orthogonal. Therefore, the common-mode antenna and the differential-mode antenna are highly isolated from each other. Herein, orthogonality may be specific to main lobe directions of two antennas. The main lobe direction is a direction with maximum radiant energy. In actual application, the polarization directions of the common-mode antenna and the differential-mode antenna may not be fully orthogonal. A slight deviation, such as a deviation within 30°, may exist to be approximately orthogonal.

Based on the foregoing antenna patterns, the following describes antenna design solutions provided in embodiments of this application.

Figure 7A:
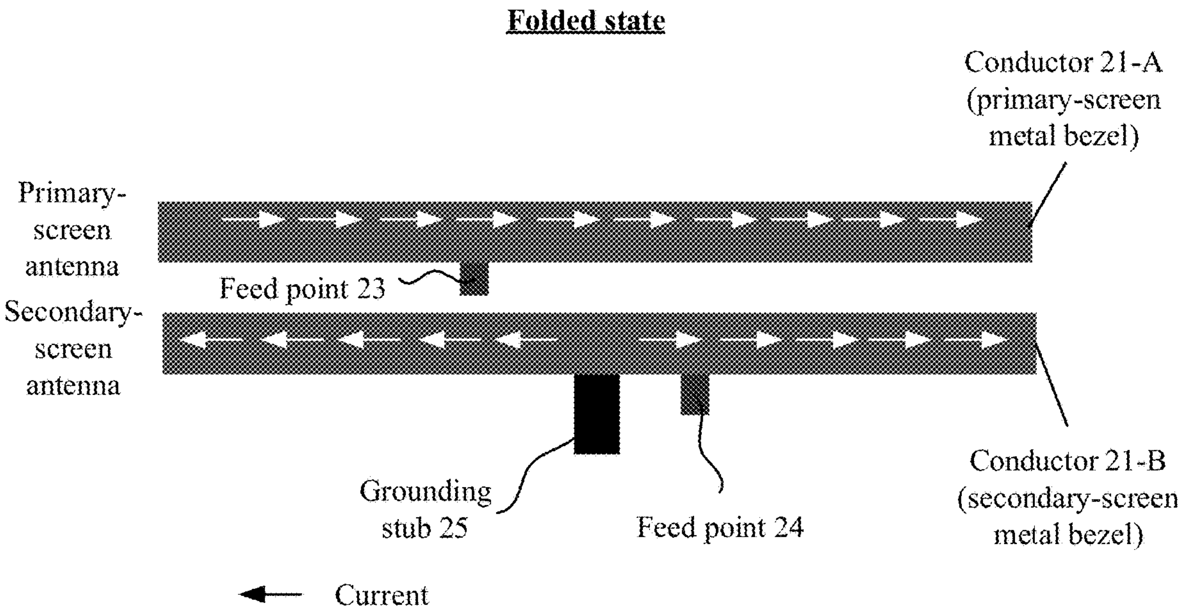
FIG. 7A to FIG. 7D are schematic diagrams of several design solutions for a primary-screen antenna and a secondary-screen antenna according to this application.

FIG. 7A shows an example solution in which a primary-screen antenna is a DM wire antenna and a secondary-screen antenna is a CM wire antenna.

As shown in FIG. 7A, when a foldable screen of an electronic device is in a folded state, the primary-screen antenna and the secondary-screen antenna overlap, which may be that the primary-screen antenna and the secondary-screen antenna fully or partially overlap. The primary-screen antenna may include a conductor 21-A and a feed point 23 disposed on the conductor 21-A. The feed point 23 may be connected to a feed source. The conductor 21-A on a primary screen may be a segment of a metal bezel of the primary screen, or a metal strip printed on an inner side of a bezel of the primary screen. Currents on the conductor 21-A may be codirectionally distributed, and the foregoing DM wire antenna pattern shown in FIG. 4A and FIG. 4B is excited. The currents that are codirectionally distributed may be primary currents distributed on the conductor 21-A, and the currents may be generated by a fundamental mode of the primary-screen antenna. The secondary-screen antenna may include a conductor 21-B, and a feed point 24 and a grounding stub 25 that are disposed on the conductor 21-B. The feed point 24 may be connected to a feed source, and the grounding stub 25 may be connected to a ground. The conductor 21-B on a secondary screen may be a segment of a metal bezel of the secondary screen, or a metal strip printed on an inner side of a bezel of the secondary screen. Currents on the conductor 21-B may be symmetrically and reversely distributed, and the foregoing CM wire antenna pattern shown in FIG. 3A and FIG. 3B is excited. The currents that are reversely distributed may be primary currents distributed on the conductor 21-A, and the currents may be generated by a fundamental mode of the primary-screen antenna.

The primary-screen antenna is the DM wire antenna, and the secondary-screen antenna is the CM wire antenna. Therefore, when the foldable screen of the electronic device is in the folded state, good isolation performance can also be obtained even if the primary-screen antenna and the secondary-screen antenna operate on a same frequency band.

In addition to the CM wire antenna pattern, the secondary-screen antenna shown in FIG. 7A may actually further excite another antenna pattern: a DM wire antenna pattern. A principle for the DM wire antenna pattern is the following: In a case in which feeding is not considered, a conductor of any shape may have a plurality of characteristic modes (characteristic mode), and one or more of the characteristic modes may be enhanced through a feeding design, so as to select a desired characteristic mode. Herein, the DM wire antenna pattern and the CM wire antenna pattern are desired characteristic modes selected by the secondary-screen antenna through feeding. When the primary-screen antenna and the secondary-screen antenna overlap due to folding of the foldable screen, the DM wire antenna pattern additionally excited by the secondary-screen antenna and the DM slot antenna pattern of the primary-screen antenna may be adjusted to different frequency bands, to prevent the DM wire antenna pattern additionally excited by the secondary-screen antenna from interfering with the DM slot antenna pattern of the primary-screen antenna.

In FIG. 7A, an inductor may be connected in parallel in a structure of the primary-screen antenna for grounding. In this way, the primary-screen antenna may be transformed into a CM wire antenna, and primary currents on the primary-screen antenna are reversely distributed. In this case, a capacitor may be connected in series in a structure of the secondary-screen antenna to short-circuit the grounding stub. In this way, the secondary-screen antenna may be transformed into a DM wire antenna, and primary currents on the secondary-screen antenna are codirectionally distributed.

Figure 7B:
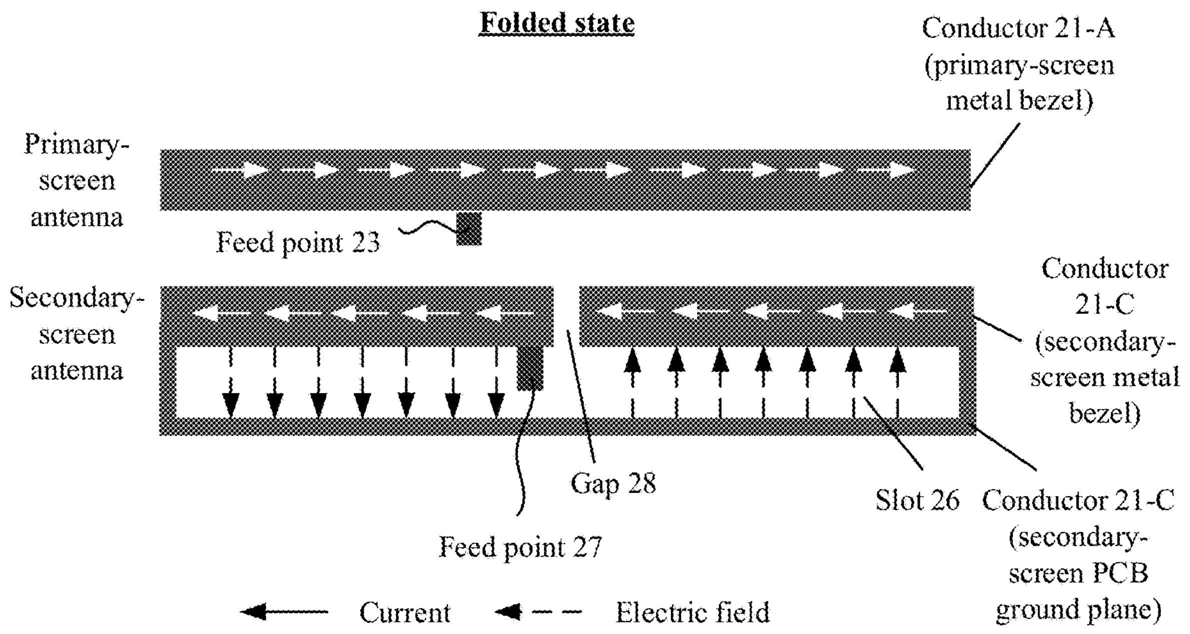

FIG. 7B shows an example solution in which a primary-screen antenna is a DM wire antenna and a secondary-screen antenna is a CM slot antenna.

As shown in FIG. 7B, when a foldable screen of an electronic device is in a folded state, the primary-screen antenna and the secondary-screen antenna overlap, which may be that the primary-screen antenna and the secondary-screen antenna fully or partially overlap. The primary-screen antenna may include a conductor 21-A and a feed point 23 disposed on the conductor 21-A. The feed point 23 may be connected to a feed source. The conductor 21-A on a primary screen may be a segment of a metal bezel of the primary screen, or a metal strip printed on an inner side of a bezel of the primary screen. Currents on the conductor 21-A may be codirectionally distributed, and for example, the foregoing DM wire antenna pattern shown in FIG. 4A and FIG. 4B is excited. The secondary-screen antenna may include a slot 26 formed on a conductor 21-C, for example, formed through slotting on the conductor 21-C. A gap 28 is provided on a side of the slot 26, and the gap 28 may be specifically provided in a middle position of the side. Herein, the middle position refers to a midpoint of the side. In other words, a position of the gap 28 covers the midpoint of the side. The conductor 21-C on a secondary screen may be formed through enclosing by a metal bezel of the secondary screen and a PCB ground of the secondary screen. For example, the slot 26 of the conductor 21-C is formed on the PCB ground of the secondary screen. To be specific, one side of the slot 26 is formed by the metal bezel of the secondary screen, and the other side of the slot 26 is formed by the PCB ground of the secondary screen. A feed point 27 may be disposed on the side that is of the slot 26 and on which the gap 28 is provided, and the feed point 27 may be connected to a feed source. Electric fields in the slot 26 may be symmetrically and reversely distributed, and the foregoing CM slot antenna pattern shown in FIG. 5A and FIG. 5B is excited. The electric fields that are reversely distributed may be primary electric fields distributed in the slot 26, and the electric fields may be generated by a fundamental mode of the secondary-screen antenna.

The primary-screen antenna is the DM wire antenna, and the secondary-screen antenna is the CM slot antenna. Therefore, when the foldable screen of the electronic device is in the folded state, good isolation performance can also be obtained even if the primary-screen antenna and the secondary-screen antenna operate on a same frequency band.

Figure 7C:
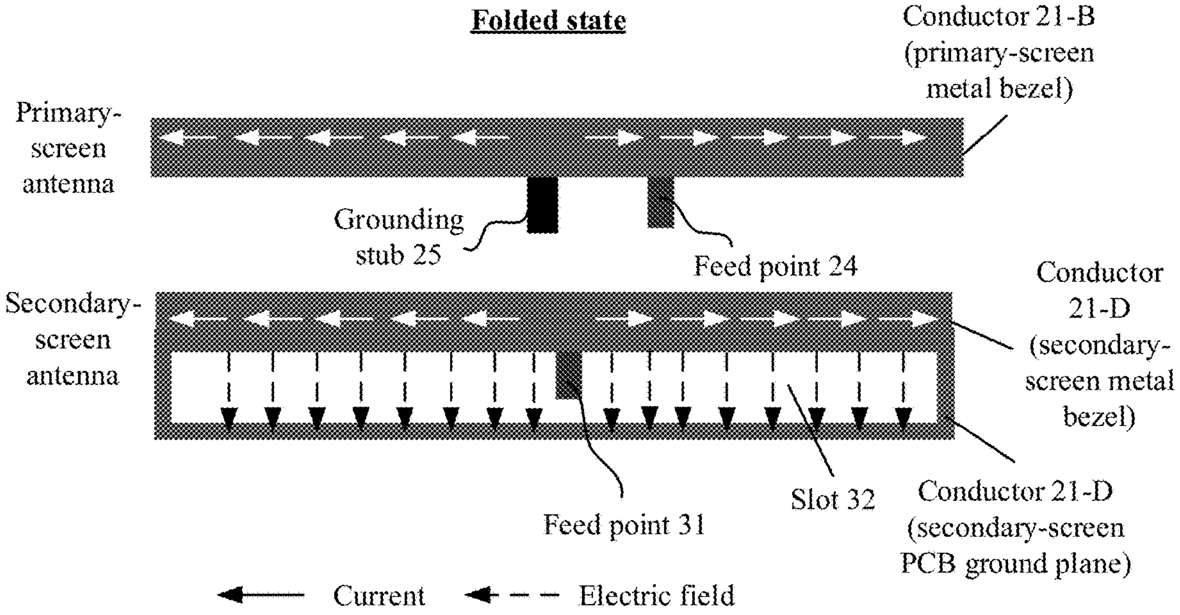

FIG. 7C shows an example solution in which a primary-screen antenna is a CM wire antenna and a secondary-screen antenna is a DM slot antenna.

As shown in FIG. 7C, when a foldable screen of an electronic device is in a folded state, the primary-screen antenna and the secondary-screen antenna overlap, which may be that the primary-screen antenna and the secondary-screen antenna fully or partially overlap. The primary-screen antenna may include a conductor 21-B, and a feed point 24 and a grounding stub 25 that are disposed on the conductor 21-B. The feed point 24 may be connected to a feed source, and the grounding stub 25 may be connected to a ground. The conductor 21-B on a primary screen may be a segment of a metal bezel of the primary screen, or a metal strip printed on an inner side of a bezel of the primary screen. Currents on the conductor 21-B may be symmetrically and reversely distributed, and for example, the foregoing CM wire antenna pattern shown in FIG. 3A and FIG. 3B is excited. The secondary-screen antenna may include a slot 32 formed through slotting on a conductor 21-D, for example, formed through slotting on the conductor 21-D. A feed point 31 may be disposed on a side of the slot 32, and the feed point 31 may be connected to a feed source. The conductor 21-D on a secondary screen may be formed through enclosing by a metal bezel of the secondary screen and a PCB ground of the secondary screen. For example, the slot 32 of the conductor 21-D is formed on the PCB ground of the secondary screen. To be specific, one side of the slot 32 is formed by the metal bezel of the secondary screen, and the other side of the slot 32 is formed by the PCB ground of the secondary screen. Electric fields in the slot 32 may be codirectionally distributed, and the foregoing DM slot antenna pattern shown in FIG. 6A and FIG. 6B is excited. The electric fields that are codirectionally distributed may be primary electric fields distributed in the slot 32, and the electric fields may be generated by a fundamental mode of the secondary-screen antenna.

The primary-screen antenna is the CM wire antenna, and the secondary-screen antenna is the DM slot antenna. Therefore, when the foldable screen of the electronic device is in the folded state, good isolation performance can also be obtained even if the primary-screen antenna and the secondary-screen antenna operate on a same frequency band.

In addition to the CM wire antenna pattern, the primary-screen antenna shown in FIG. 7C may actually further excite another antenna pattern: a DM wire antenna pattern. A principle for the DM wire antenna pattern has been described above. When the primary-screen antenna and the secondary-screen antenna overlap due to folding of the foldable screen, the DM wire antenna pattern excited by the primary-screen antenna and the DM slot antenna pattern of the secondary-screen antenna may be set to different frequency bands, to prevent the DM wire antenna pattern of the primary-screen antenna from interfering with the DM slot antenna pattern of the secondary-screen antenna.

Figure 7D:
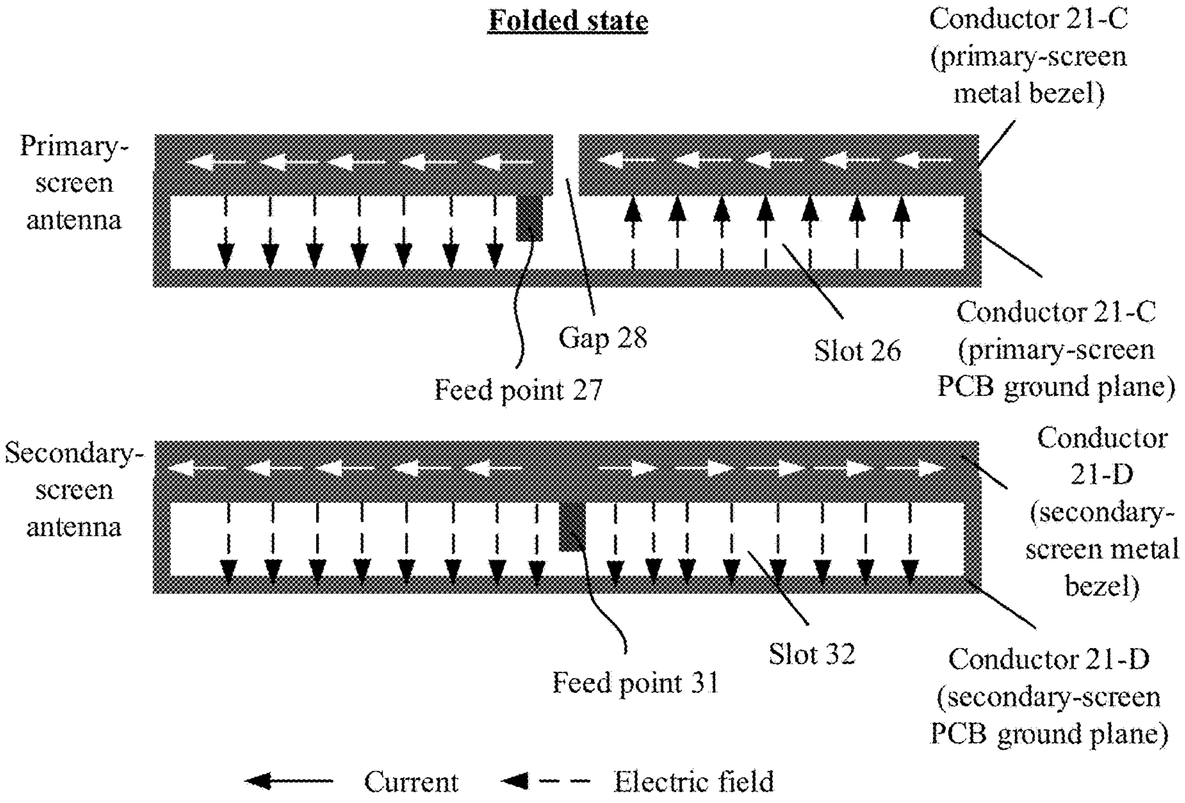

FIG. 7D shows an example solution in which a primary-screen antenna is a CM slot antenna and a secondary-screen antenna is a DM slot antenna.

As shown in FIG. 7D, when a foldable screen of an electronic device is in a folded state, the primary-screen antenna and the secondary-screen antenna overlap, which may be that the primary-screen antenna and the secondary-screen antenna fully or partially overlap. The primary-screen antenna may include a slot 26 formed on a conductor 21-C, for example, formed through slotting on the conductor 21-C. A gap 28 is provided on a side of the slot 26, and the gap 28 may be specifically provided in a middle position of the side. Herein, the middle position refers to a midpoint of the side. In other words, a position of the gap 28 covers the midpoint of the side. A feed point 27 may be disposed on the side that is of the slot 26 and on which the gap 28 is provided, and the feed point 27 may be connected to a feed source. The conductor 21-C on a primary screen may be formed through enclosing by a metal bezel of the primary screen and a PCB ground of the secondary screen. For example, the slot 26 of the conductor 21-C is formed on the PCB ground of the primary screen. To be specific, one side of the slot 26 is formed by the metal bezel of the primary screen, and the other side of the slot 26 is formed by the PCB ground of the primary screen. Electric fields in the slot 26 may be symmetrically and reversely distributed, and the foregoing CM slot antenna pattern shown in FIG. 5A and FIG. 5B is excited. The electric fields that are reversely distributed may be primary electric fields distributed in the slot 26, and the electric fields may be generated by a fundamental mode of the primary-screen antenna. The secondary-screen antenna may include a slot 32 formed through slotting on a conductor 21-D, for example, formed through slotting on the conductor 21-D. A feed point 31 may be disposed on a side of the slot 32, and the feed point 31 may be connected to a feed source. The conductor 21-D on a secondary screen may be formed through enclosing by a metal bezel of the secondary screen and a PCB ground of the secondary screen. For example, the slot 32 of the conductor 21-D is formed on the PCB ground of the secondary screen. To be specific, one side of the slot 32 is formed by the metal bezel of the secondary screen, and the other side of the slot 32 is formed by the PCB ground of the secondary screen. Electric fields in the slot 32 may be codirectionally distributed, and the foregoing DM slot antenna pattern shown in FIG. 6A and FIG. 6B is excited. The electric fields that are codirectionally distributed may be primary electric fields distributed in the slot 32, and the electric fields may be generated by a fundamental mode of the secondary-screen antenna.

The primary-screen antenna is the CM slot antenna, and the secondary-screen antenna is the DM slot antenna. Therefore, when the foldable screen of the electronic device is in the folded state, good isolation performance can also be obtained even if the primary-screen antenna and the secondary-screen antenna operate on a same frequency band.

In the foregoing solutions shown in FIG. 7A to FIG. 7D, the primary-screen antenna may be disposed on the primary screen, and the secondary-screen antenna may be disposed on the secondary screen. Specifically, the conductor 21-A and the conductor 21-B each may be a suspended metal strip, and may be formed by a metal bezel, a metal middle frame, or the like of the electronic device. For an electronic device having a non-metal industrial design (industry design, ID), the conductor 21-A and the conductor 21-B each may be a metal strip printed on an inner surface of a non-metal bezel, or a metal strip printed on an inner surface of a non-metal bezel through conductive silver paste. Specifically, the slot 26 and the slot 32 each may be formed on a conductor such as a PCB ground or a metal middle frame, for example, formed through slotting on the conductor. Implementation of the primary-screen antenna and the secondary-screen antenna in the entire device is described in detail in the following embodiments, and details are not described herein.

In the foregoing solutions shown in FIG. 7A to FIG. 7D, positions of the primary-screen antenna and the secondary-screen antenna may be interchanged. For example, the primary-screen antenna in FIG. 7A may be disposed on the secondary screen to serve as the secondary-screen antenna, and the secondary-screen antenna in FIG. 7A may be disposed on the primary screen to serve as the primary-screen antenna.

According to the solutions shown in FIG. 7A to FIG. 7D, in a scenario in which the foldable screen of the electronic device is in the folded state, good isolation performance can be also obtained even if the primary-screen antenna and the secondary-screen antenna overlap and operate on a same frequency band. In addition, radiation patterns of the primary-screen antenna and the secondary-screen antenna are complementary. In this way, two or more antennas that operate on a same frequency band can be highly isolated from each other without isolating the antennas at physical positions. This fully utilizes an antenna design space of an electronic device having a foldable screen.

The following describes in detail implementation of a primary-screen antenna and a secondary-screen antenna in an entire device with reference to several embodiments. In the electronic device, a dielectric constant of a material that is filled in a hollow interior formed between a metal bezel and a PCB ground and filled in a gap on the metal bezel may be 3.0, and a dielectric loss angle of the material may be 0.01.

Embodiment 1

Figure 8A:
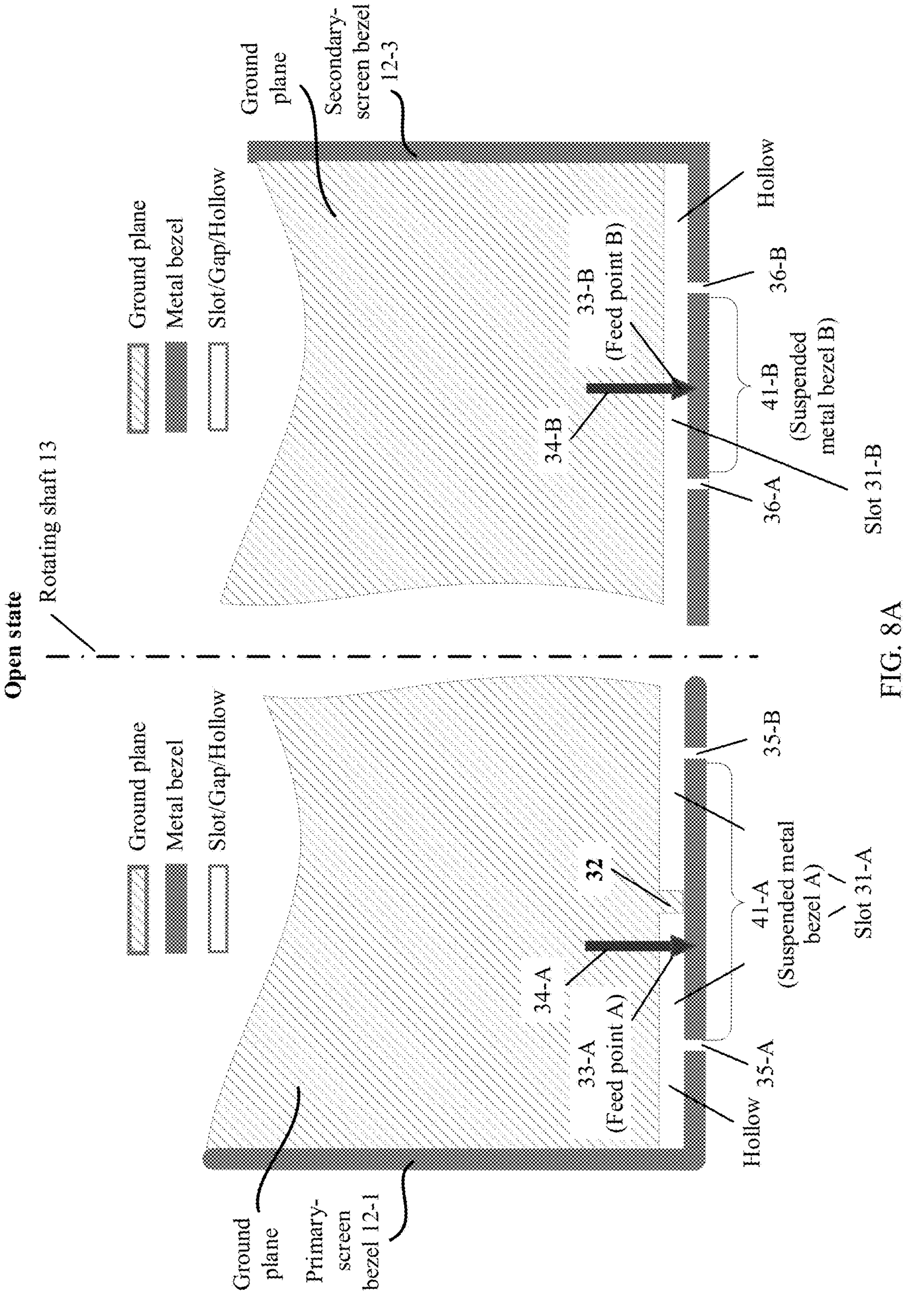
FIG. 8A to FIG. 8C are schematic diagrams of implementation of an antenna design solution shown in FIG. 7A in an electronic device.
Figure 8B:
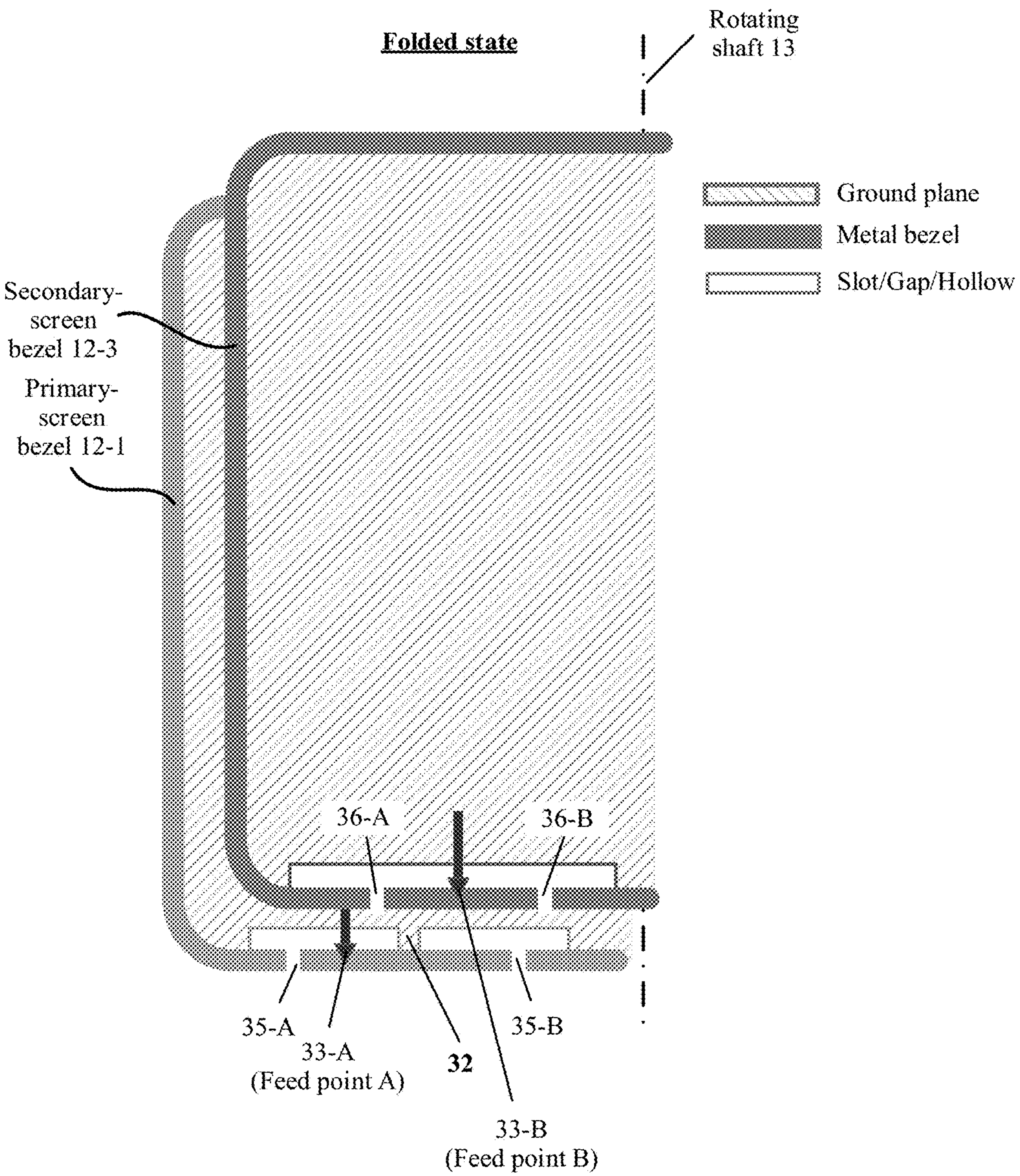

FIG. 8A and FIG. 8B show examples of an antenna structure provided in Embodiment 1. FIG. 8A shows an antenna structure formed when a foldable screen 11 is in an open state, and FIG. 8B shows an antenna structure formed when the foldable screen 11 is in a folded state. The antenna structure provided in Embodiment 1 includes a primary-screen antenna and a secondary-screen antenna, where the primary-screen antenna may be a CM wire antenna and the secondary-screen antenna may be a DM wire antenna.

As shown in FIG. 8A, the primary-screen antenna may be implemented by hollowing out a PCB ground and opening a gap on a metal bezel. Specifically, a suspended metal bezel 41-A may be formed by opening gaps, such as two gaps 35-A and 35-B that are 0.9 millimeter to 2.0 millimeters wide, on a specific portion (such as a bottom bezel portion) of a primary-screen bezel 12-1, and by hollowing out a PCB ground that is adjacent to the specific portion of the primary-screen bezel 12-1. A hollow portion may form a slot 31-A parallel to the suspended metal bezel 41-A, to separate the suspended metal bezel 41-A from a primary-screen PCB ground. In this way, the suspended metal bezel 41-A is suspended from a ground. In other words, a clearance is formed. A length of the slot 31-A is greater than a length of the suspended metal bezel 41-A. To be specific, a slot longer than the suspended metal bezel 41-A is formed along an extension direction of the specific portion of the primary-screen bezel 12-1 and across the two gaps 35-A and 35-B. In this way, a metal bezel between the two gaps 35-A and 35-B forms the suspended metal bezel, and therefore forms a wire antenna radiator. The suspended metal bezel 41-A may be equivalent to the conductor 21-B in FIG. 7A. In addition, a non-hollow portion 32 may form a grounding stub that is connected to the suspended metal bezel 41-A, and the non-hollow portion 32 may be a strip-shaped ground stub shown in FIG. 8A. In addition to the strip-shaped ground stub, the grounding stub may alternatively be implemented by using a metal elastic piece disposed on a PCB ground of a primary screen portion, where the metal elastic piece may be connected to the suspended metal bezel 41-A. Alternatively, the grounding stub may be a metal stub that extends from a metal bezel of the primary screen portion and that is connected to the PCB ground. The specific portion of the primary-screen bezel 12-1 may be referred to as a first primary-screen bezel portion.

FIG. 8A further shows a feeding manner of the primary-screen antenna. A feed point 33-A may be disposed on the suspended metal bezel 41-A, to connect a feeder 34-A to a feed source. The feed point 33-A may be disposed close to a ground point to excite a CM wire antenna pattern. The ground point is a connection position for the grounding stub (the non-hollow portion) and the suspended metal bezel 41-A. The ground point may be disposed in a middle of the suspended metal bezel 41-A, or may be disposed at a position close to the middle of the suspended metal bezel 41-A. That the ground point is disposed in the middle of the suspended metal bezel 41-A may mean that the ground point is disposed at a midpoint of the suspended metal bezel 41-A. In other words, the connection position for the grounding stub and the suspended metal bezel 41-A covers the midpoint. Being close may mean that a distance from the ground point to the middle position is not greater than ⅛ of an operating wavelength. In addition to a position close to the ground point, the feed point 33-A may alternatively be disposed close to an open end of the suspended metal bezel 41-A. Herein, that the feed point 33-A is close to the ground point may mean that a distance from the feed point 33-A to the ground point is greater than 0 and less than ⅛ of the operating wavelength. That the feed point 33-A is close to the open end of the suspended metal bezel 41-A may mean that a distance from the feed point 33-A to the open end is not greater than ⅛ of the operating wavelength, and may even be equal to 0. The operating wavelength is an operating wavelength of the primary-screen antenna in the CM wire antenna pattern. A manner of calculating the operating wavelength is described in the following content, and details are not described herein.

It should be understood that the midpoint of the suspended metal bezel 41-A may be considered as a midpoint in terms of a length of the suspended metal bezel 41-A, and the length herein may be considered as an electrical length. The electrical length may be represented by a ratio of a physical length (that is, a mechanical length or a geometric length) multiplied by time for which an electrical or electromagnetic signal is transmitted in a medium to time for the signal to travel a distance equal to a physical length of the medium in free space. The electrical length may meet the following formula:

$$\bar{L} = L \times \frac{a}{b}.$$

L represents the physical length, a represents the time for which the electrical or electromagnetic signal is transmitted in the medium, and b represents transmission time in free space.

Alternatively, the electrical length may be a ratio of the physical length (that is, the mechanical length or the geometric length) to a wavelength of a transmitted electromagnetic wave. The electrical length may meet the following formula:

$$\bar{L} = \frac{L}{\lambda}.$$

L represents the physical length, and λ represents the wavelength of the electromagnetic wave.

Similarly, as shown in FIG. 8A, the secondary-screen antenna may also be implemented by hollowing out a PCB ground and opening a gap on a metal bezel. Specifically, a suspended metal bezel 41-B may be formed by opening gaps, such as two gaps 36-A and 36-B, on a specific portion (such as a bottom bezel portion) of a secondary-screen bezel 12-3, and by hollowing out a PCB ground that is adjacent to the specific portion of the secondary-screen bezel 12-3. A hollow portion may form a slot 31-B parallel to the suspended metal bezel 41-B, to separate the suspended metal bezel 41-B from a secondary-screen PCB ground. In this way, the suspended metal bezel 41-B is suspended from the ground. In other words, a clearance is formed. A length of the slot 31-B is greater than a length of the suspended metal bezel 41-B. To be specific, a slot longer than the suspended metal bezel 41-B is formed along an extension direction of the specific portion adjacent to the secondary-screen bezel 12-3 and across the two gaps 36-A and 36-B. In this way, a metal bezel between the two gaps 36-A and 36-B forms the suspended metal bezel, and therefore forms a wire antenna radiator. The suspended metal bezel 41-B may be equivalent to the conductor 21-A in FIG. 7A. Different from the primary-screen antenna, no grounding stub is disposed on the suspended metal bezel 41-B in the secondary-screen antenna. The secondary-screen antenna does not include a structure the same as the non-hollow portion 32 of the primary-screen antenna. The specific portion of the secondary-screen bezel 12-1 may be referred to as a first secondary-screen bezel portion.

FIG. 8A further shows a feeding manner of the secondary-screen antenna. A feed point 33-B may be disposed on the suspended metal bezel 41-B, to connect a feeder 34-B to a feed source. The feed point 33-B may be disposed close to a middle position of the suspended metal bezel 41-B, which may be referred to as offset feeding from the middle, to excite a DM wire antenna pattern. That the feed point 33-B is disposed in the middle position of the suspended metal bezel 41-B may mean that the feed point 33-B is disposed at a midpoint of the suspended metal bezel 41-B. In other words, a connection position for the feeder 34-B and the suspended metal bezel 41-B covers the midpoint. In addition to a position close to the middle position, the feed point 33-B may alternatively be disposed close to an open end of the suspended metal bezel 41-B. Being close herein may mean that a distance from the feed point 33-B to the middle position of the suspended metal bezel 41-B is less than 1/16 of an operating wavelength, or a distance from the feed point 33-B to the open end of the suspended metal bezel 41-B is less than 1/16 of the operating wavelength. Being close may also include a case in which the distance is equal to 0. The operating wavelength is an operating wavelength of the secondary-screen antenna in the DM wire antenna pattern.

Figure 8C:
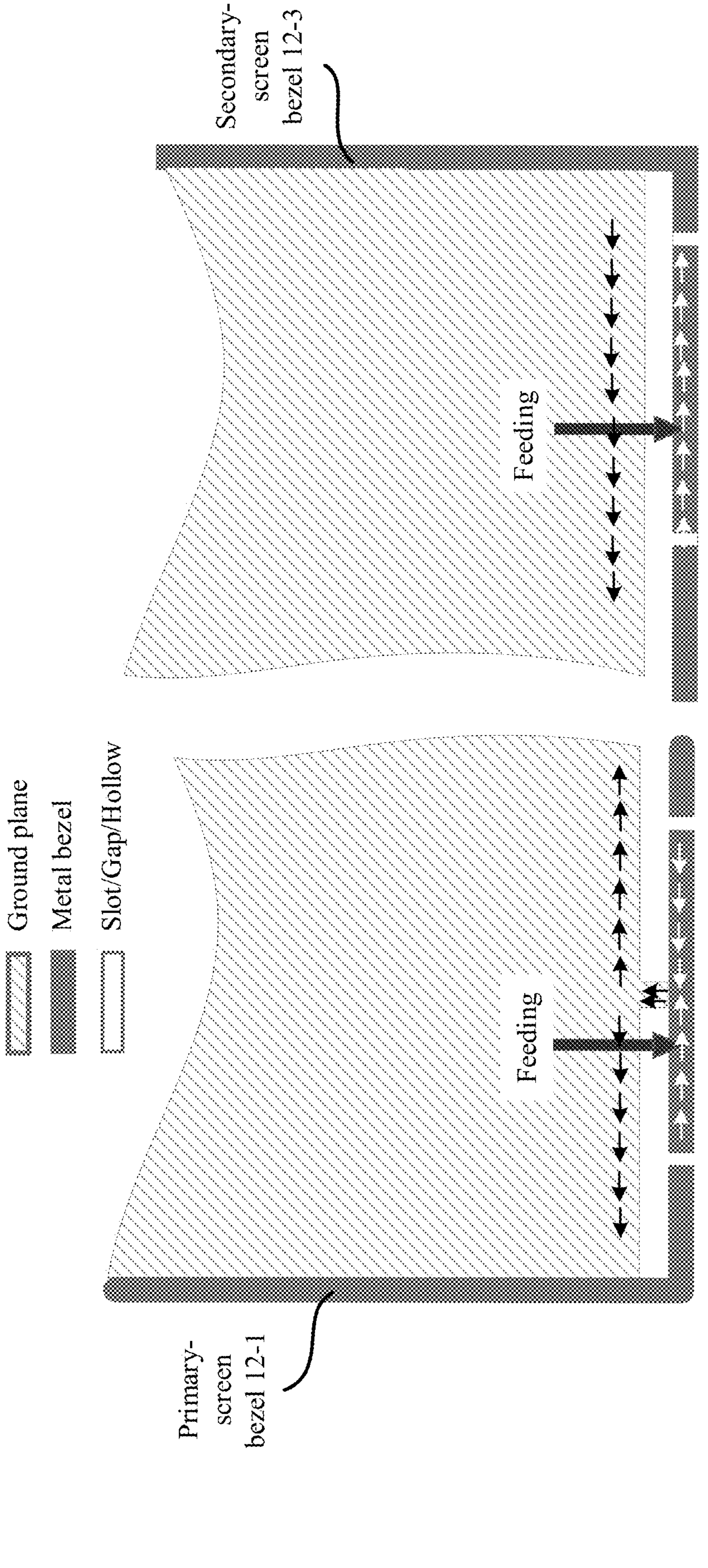

The primary-screen antenna and the secondary-screen antenna in FIG. 8A may be antennas that operate on a same frequency band. For current distribution on the primary-screen antenna, reference may be made to FIG. 3A. To be specific, currents on the suspended metal bezel 41-A are symmetrically and reversely distributed. For current distribution on the secondary-screen antenna, reference may be made to FIG. 4A. To be specific, currents on the suspended metal bezel 41-B are codirectionally distributed. In addition, the primary-screen antenna and the secondary-screen antenna may further excite the ground to generate currents whose distribution is shown in FIG. 8C. For a radiation direction of the primary-screen antenna, reference may be made to FIG. 3B. To be specific, the primary-screen antenna radiates in a direction along the suspended metal bezel 41-A. For a radiation direction of the secondary-screen antenna, reference may be made to FIG. 4B. To be specific, the secondary-screen antenna radiates in a direction perpendicular to the suspended metal bezel 41-B.

FIG. 8B shows an example of a position relationship between the primary-screen antenna and the secondary-screen antenna when the foldable screen 11 is in the folded state. When the foldable screen 11 is in the folded state, positions of the primary-screen antenna and the secondary-screen antenna overlap. For example, the primary-screen antenna is located on a primary-screen bezel portion (that is, the first primary-screen bezel portion) that forms the suspended metal bezel 41-A, and the secondary-screen antenna is located on a secondary-screen bezel portion (that is, the first secondary-screen bezel portion) that forms the suspended metal bezel 41-B. The overlap does not affect performance of the primary-screen antenna and the secondary-screen antenna because the primary-screen antenna and the secondary-screen antenna are respectively the CM wire antenna and the DM wire antenna whose radiation directions are orthogonal. Even if the primary-screen antenna and the secondary-screen antenna operate on a same frequency band (such as a B1 frequency band, a B3 frequency band, a B7 frequency band, an N77 frequency band, or a frequency band from 3.6 GHz to 4.1 GHz), good isolation performance can also be obtained. In this way, two antennas operating on a same frequency band can be disposed in overlapping areas of the primary screen and the secondary screen, and directivity patterns of the two antennas are complementary.

Figure 9A:
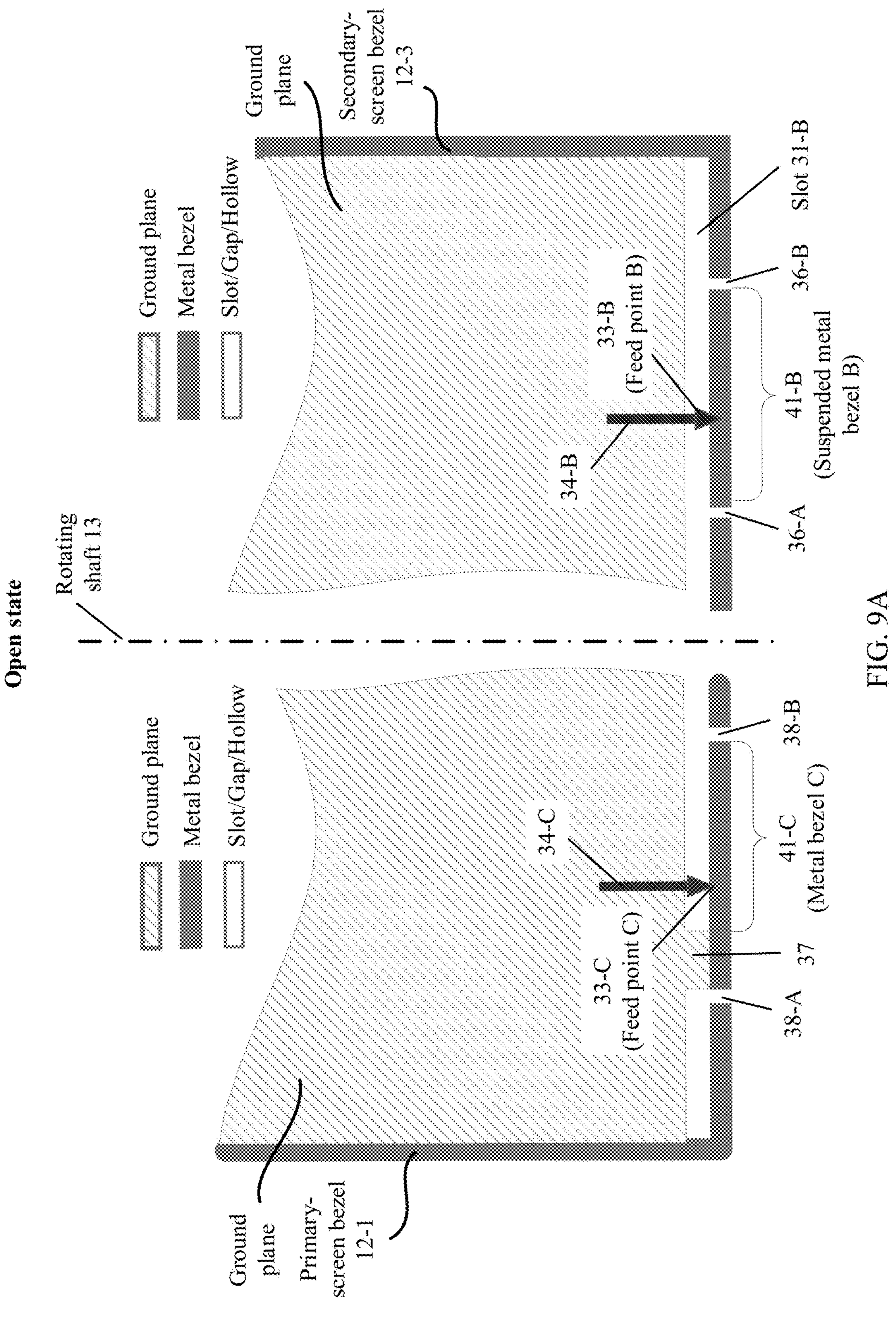
FIG. 9A to FIG. 9D are schematic diagrams of a variant implementation of the antenna design solution shown in FIG. 7A in an electronic device.
Figure 9B:
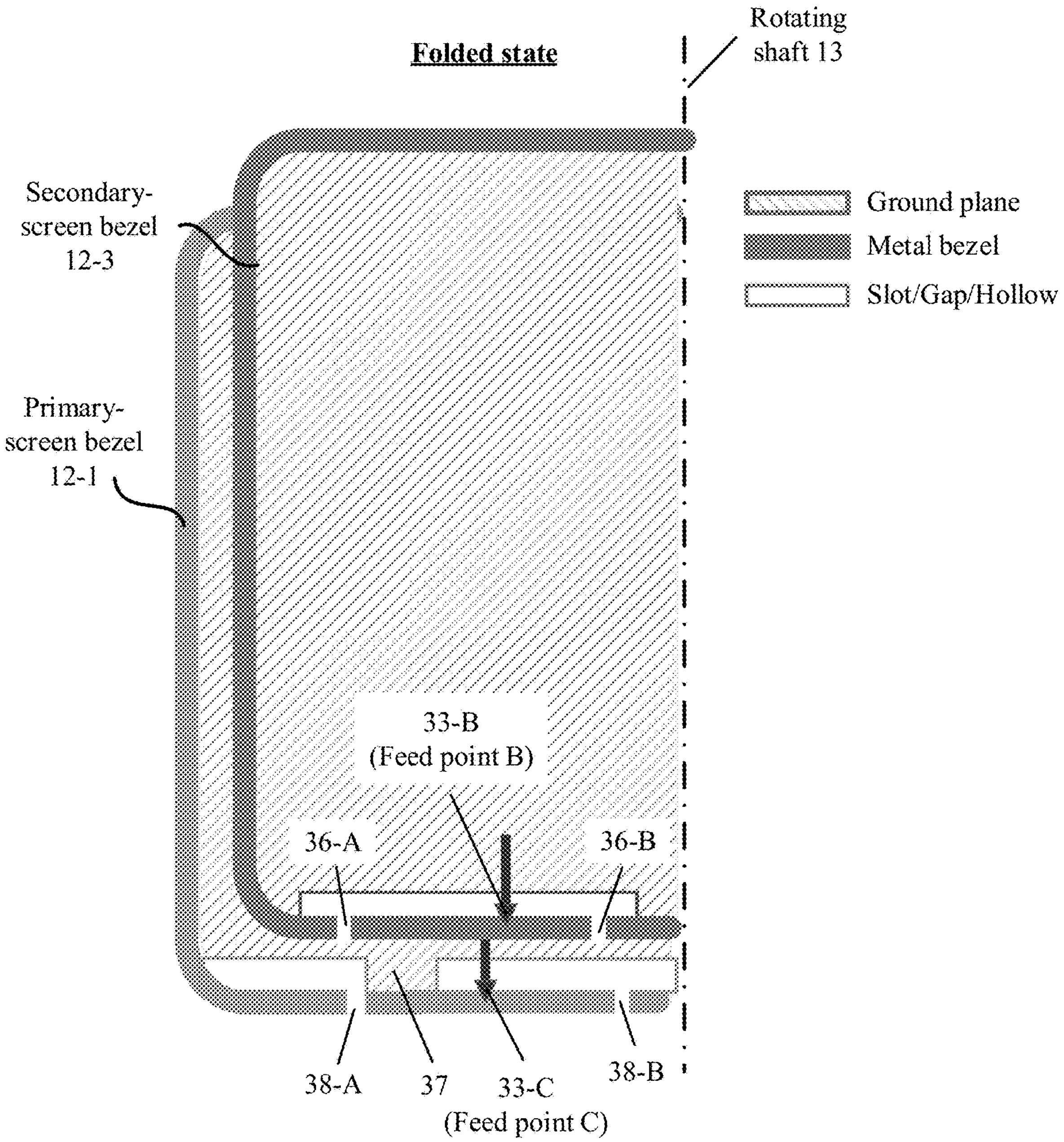
Figure 9C:
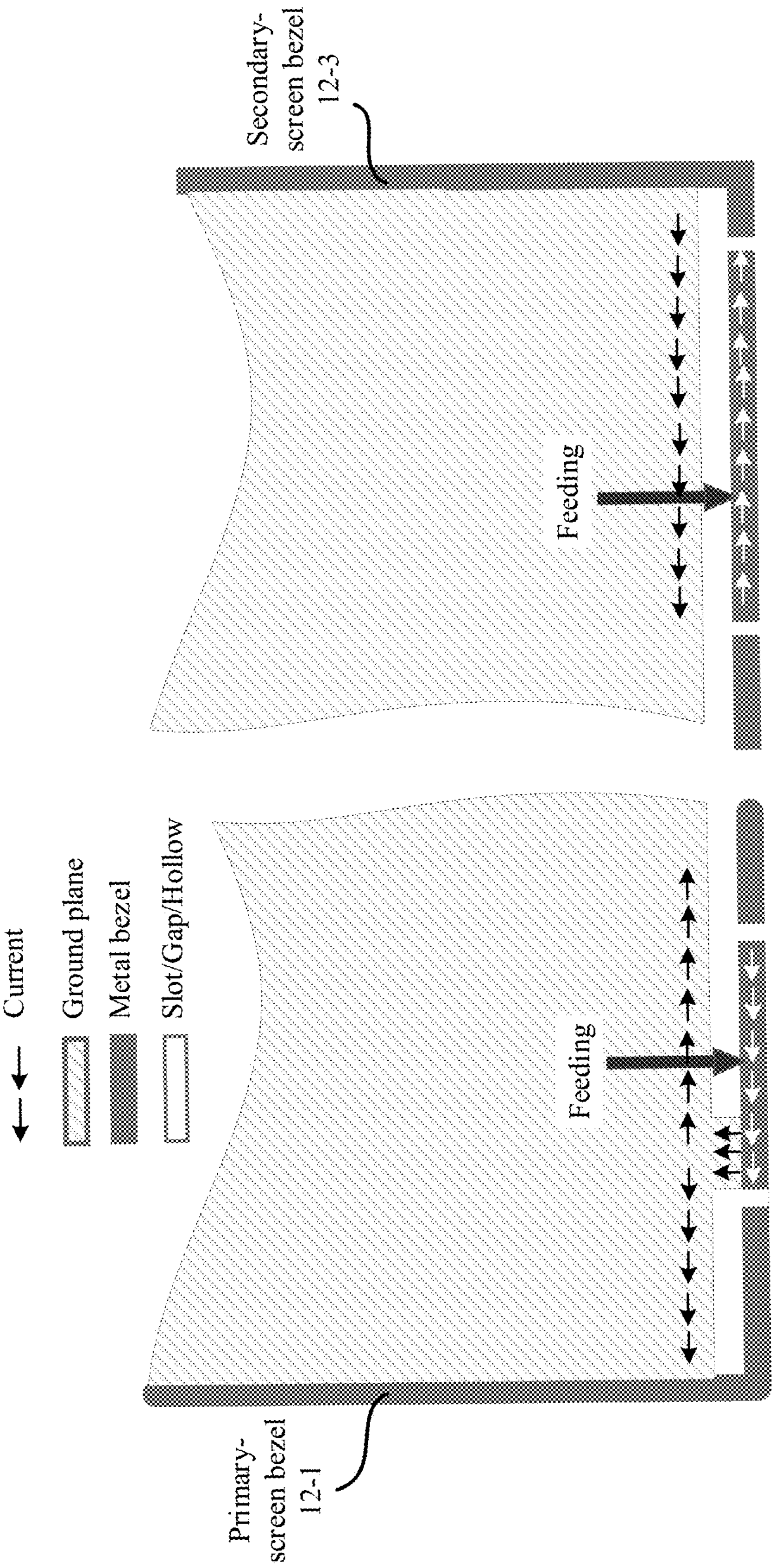
Figure 9D:
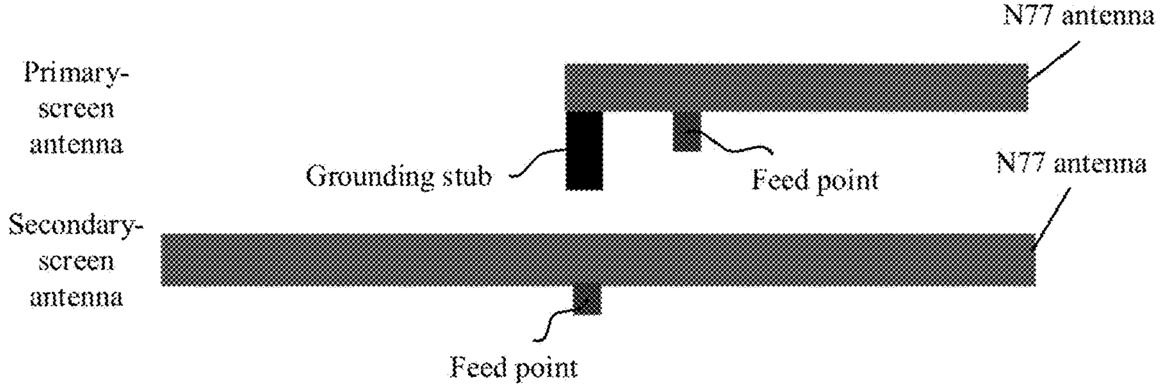
Figure 9E:
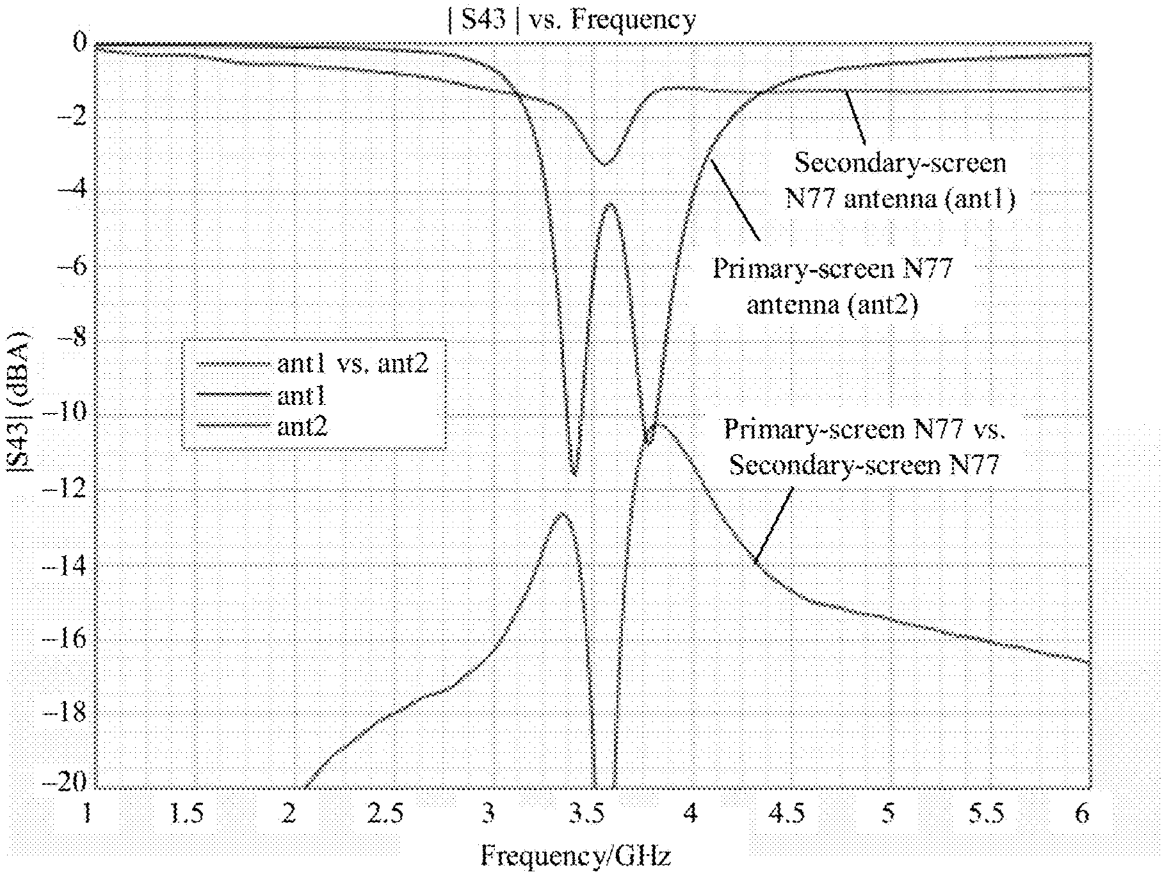
FIG. 9E is a schematic diagram of simulation of an antenna structure shown in FIG. 9A to FIG. 9D.

Antennas on the foldable screen in Embodiment 1 may be further transformed into antennas shown in FIG. 9A and FIG. 9B. To be specific, the primary-screen antenna may be transformed from the CM wire antenna to an inverted F antenna (inverted F antenna, IFA) that operates in a ¼ wavelength mode. FIG. 9C shows distribution of currents excited by a primary-screen IFA wire antenna and a secondary-screen DM wire antenna. Distribution of ground currents excited by the primary-screen IFA wire antenna conforms to distribution of ground currents excited by the CM wire antenna. In this way, a radiation direction of the primary-screen IFA wire antenna is basically the same as a radiation direction of the CM wire antenna, and is orthogonal to a radiation direction of the secondary-screen DM wire antenna. Simulation experiments show that maximum radiation directions in directivity patterns of the primary-screen IFA wire antenna and the secondary-screen DM wire antenna are orthogonal. Therefore, even if the two antennas operate on a same frequency band, high isolation performance can also be obtained when the foldable screen 11 is in the folded state. FIG. 9D shows a simplified structure of the antennas in FIG. 9A and FIG. 9B in the folded state. For example, the primary-screen antenna may operate on the N77 frequency band (for example, from 3.6 GHz to 4.1 GHz) and in the ¼ wavelength mode. The secondary-screen antenna may also operate on the N77 frequency band but in a ½ wavelength mode. It can be learned from FIG. 9E that isolation performance between a primary-screen N77 antenna and a secondary-screen N77 antenna is good.

Figure 9F:
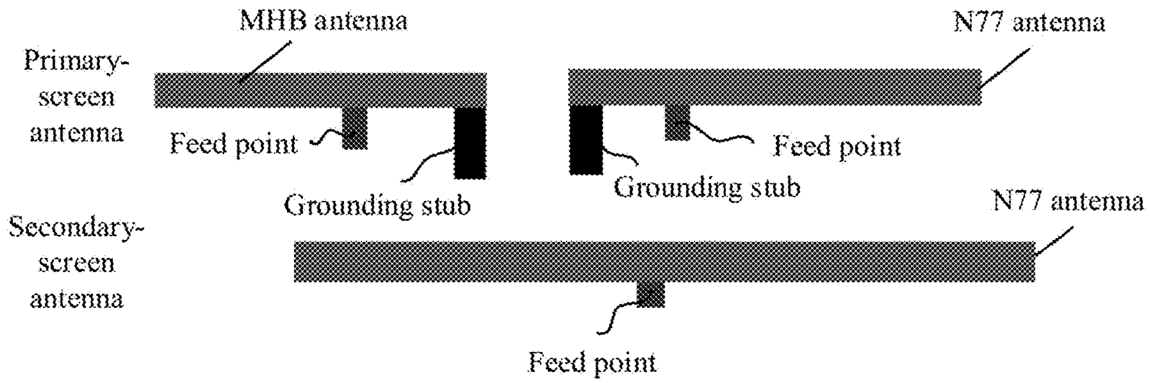
FIG. 9F is a schematic diagram of another variant implementation of the antenna design solution shown in FIG. 7A in an electronic device.
Figure 9G:
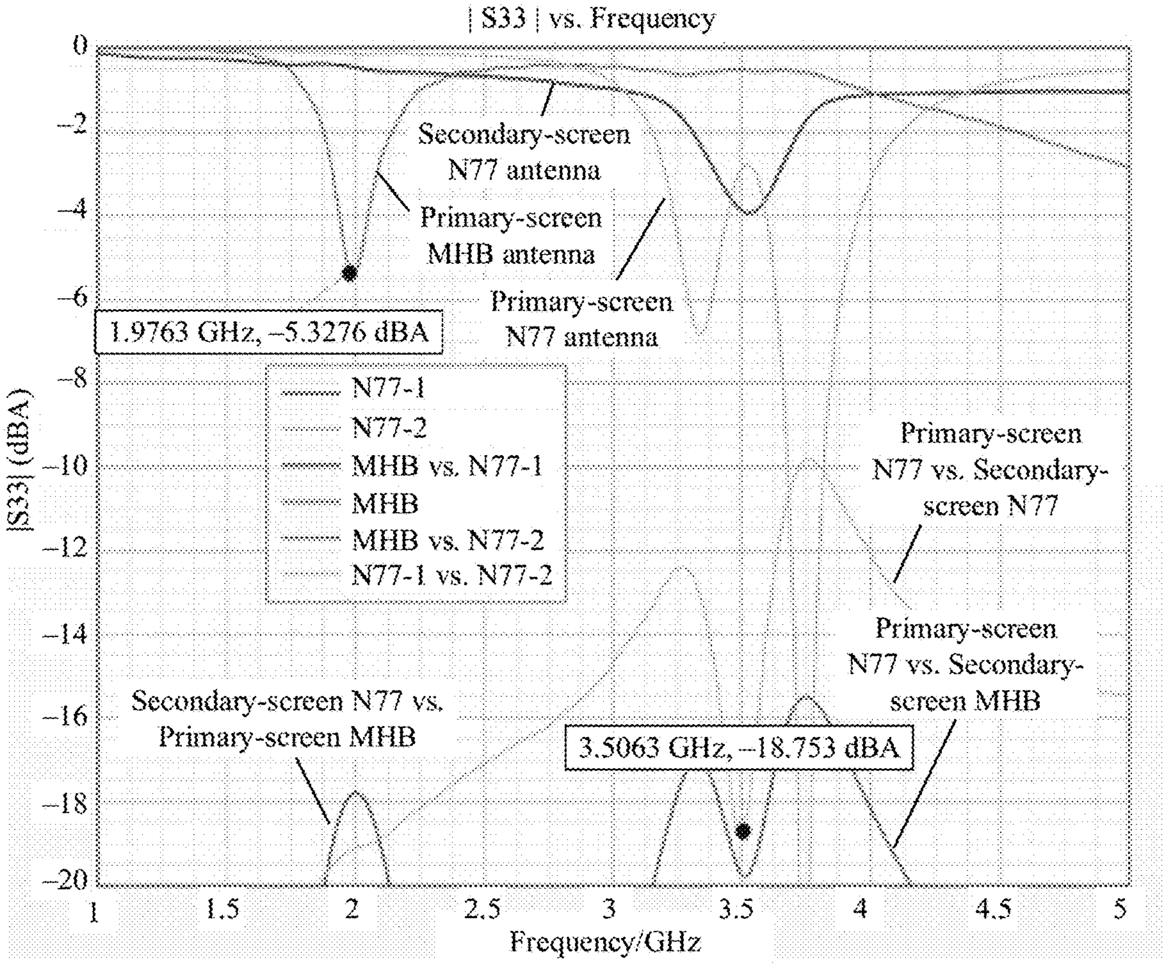
FIG. 9G and FIG. 9H are schematic diagrams of simulation of an antenna structure shown in FIG. 9F.
Figure 9H:
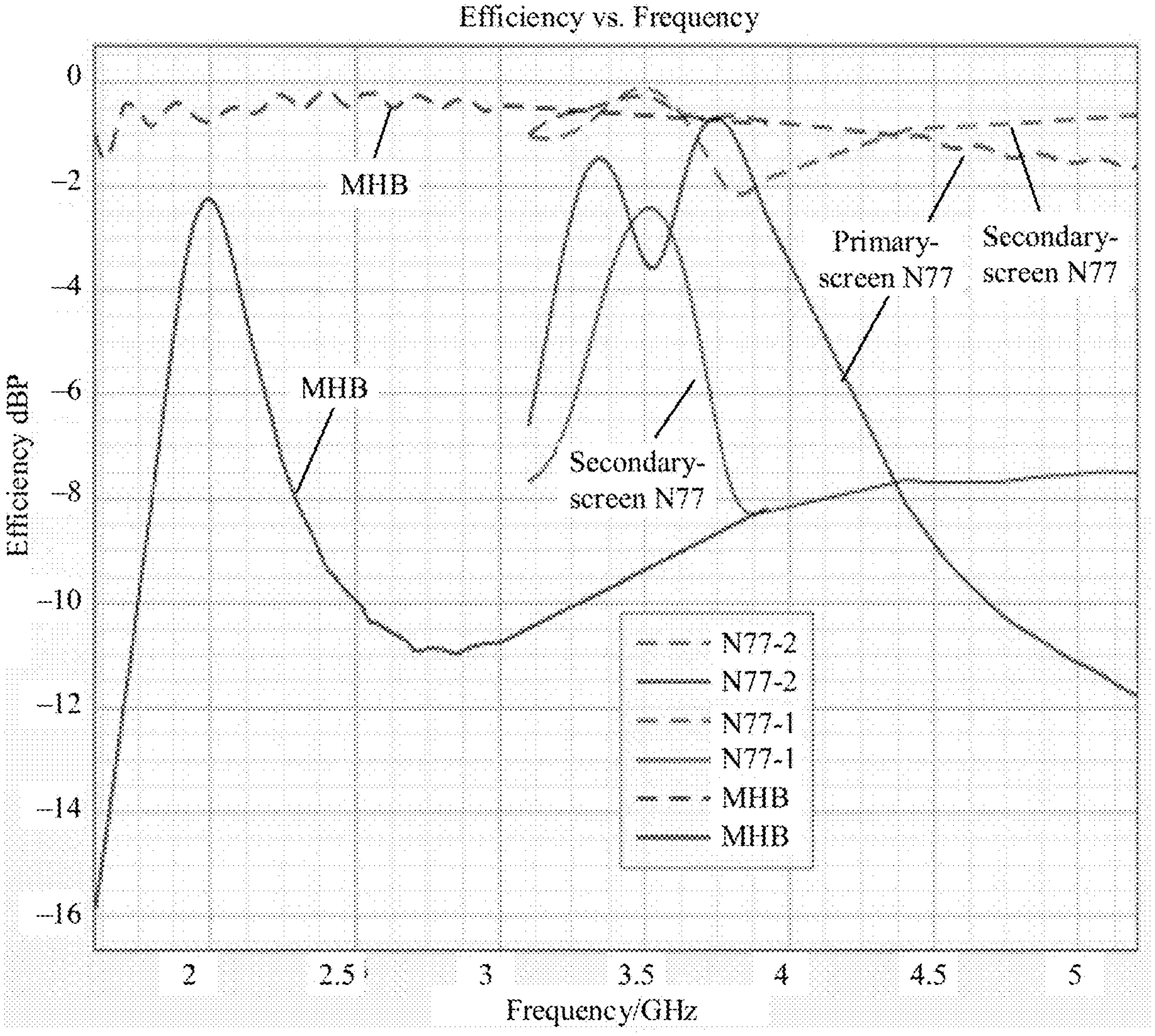

To cover more frequency bands, a plurality of primary-screen antennas may be designed at a position at which the primary-screen antenna and the secondary-screen DM wire antenna overlap. For example, a plurality of primary-screen IFA antennas may be designed. The plurality of primary-screen IFA antennas may include an IFA antenna that operates on a same frequency band as the secondary-screen DM wire antenna, and may also include an IFA antenna that operates on a frequency band different from the secondary-screen DM wire antenna. For example, as shown in FIG. 9F, two primary-screen IFA antennas may be disposed. One of the antennas may operate on the N77 frequency band, and the other of the antennas may operate on a mid-high band (mid-high band, MHB). It can be learned from FIG. 9G and FIG. 9H that, when the foldable screen is in the folded state, antennas shown in FIG. 9F are slightly affected by each other, and radiation efficiency and system efficiency are still high.

In a case in which the primary-screen antenna is transformed from the CM wire antenna to the inverted F antenna, the secondary-screen antenna may alternatively be a DM slot antenna. In this case, high isolation performance may still be obtained when the primary-screen antenna and the secondary-screen antenna overlap. For specific implementation of the DM slot antenna in the entire device, refer to the DM slot antenna described in subsequent embodiments in FIG. 10A and FIG. 10B and FIG. 12A and FIG. 12B.

Embodiment 2

Figure 10A:
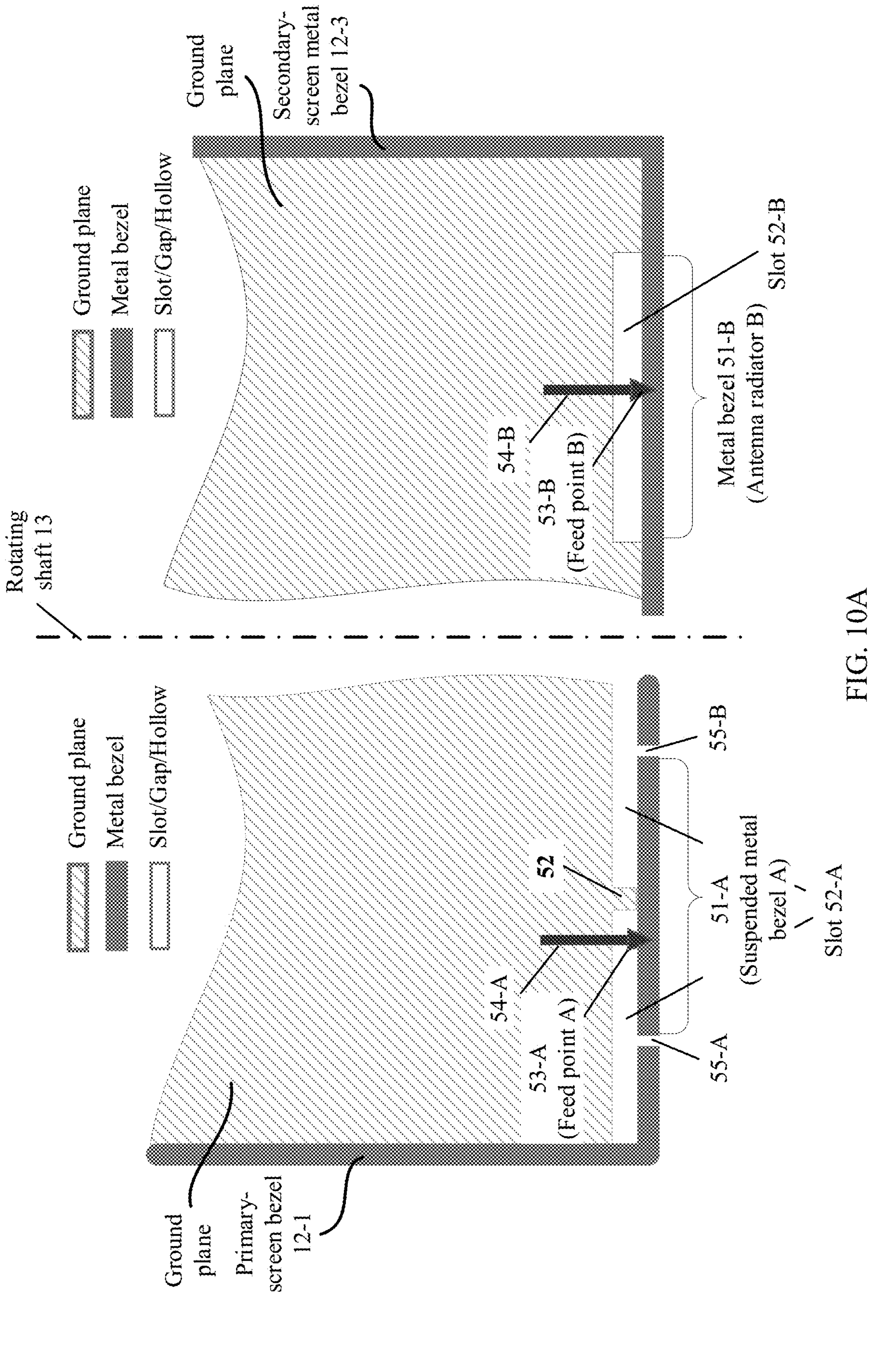
FIG. 10A and FIG. 10B are schematic diagrams of implementation of an antenna design solution shown in FIG. 7B in an electronic device.
Figure 10B:
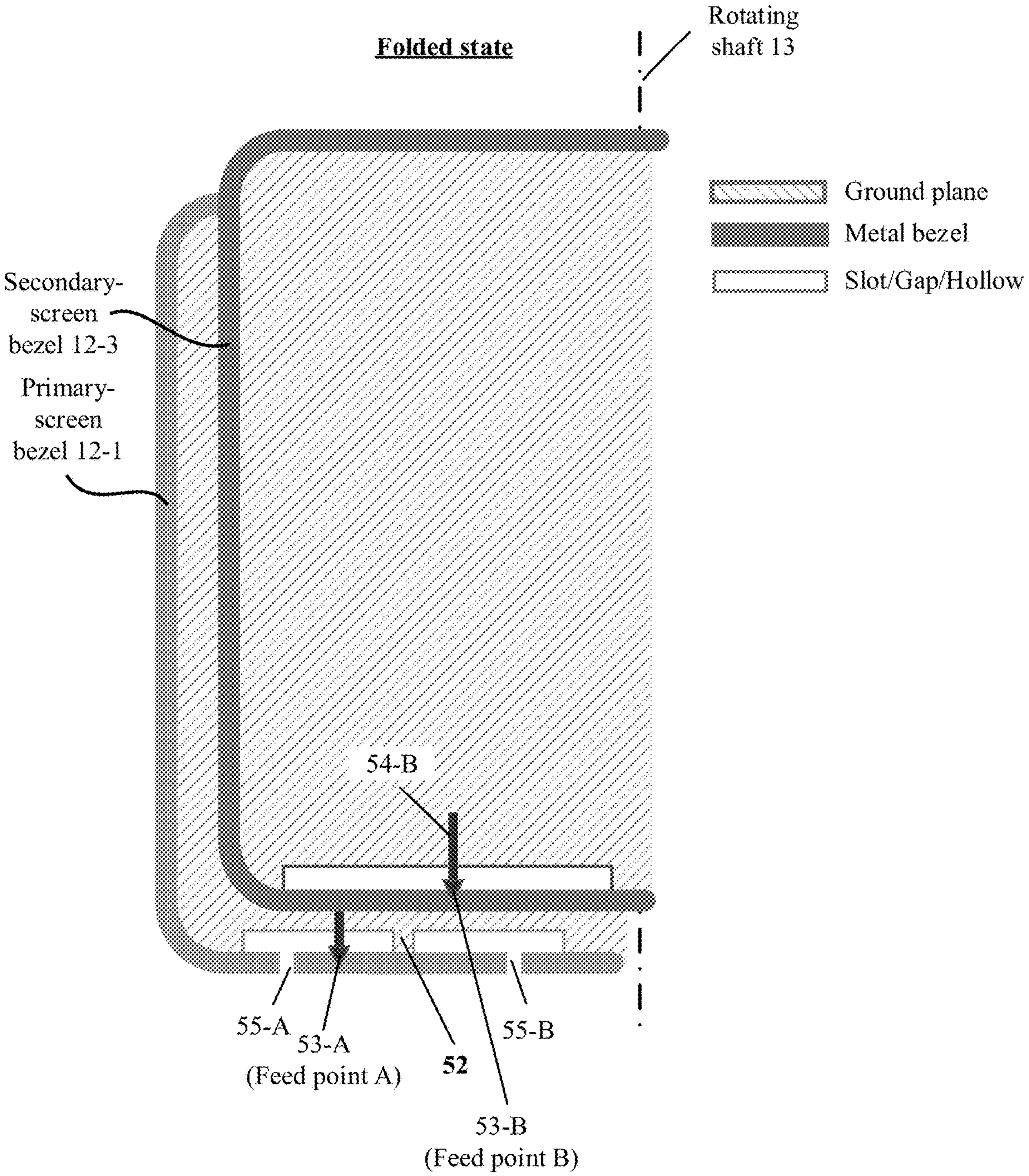

FIG. 10A and FIG. 10B show examples of an antenna structure provided in Embodiment 2. FIG. 10A shows an antenna structure formed when a foldable screen 11 is in an open state, and FIG. 10B shows an antenna structure formed when the foldable screen 11 is in a folded state. The antenna structure provided in Embodiment 2 includes a primary-screen antenna and a secondary-screen antenna, where the primary-screen antenna may be a CM wire antenna and the secondary-screen antenna may be a DM slot antenna.

As shown in FIG. 10A, the primary-screen antenna in Embodiment 2 is the same as the primary-screen antenna shown in FIG. 8A, and may be implemented by hollowing out a PCB ground and opening a gap on a metal bezel. For details, refer to related descriptions in FIG. 8A, and details are not described herein.

As shown in FIG. 10A, the secondary-screen antenna may be implemented by hollowing out a PCB ground. Specifically, a PCB ground adjacent to a specific portion (such as a bottom bezel portion) of a secondary-screen metal bezel 12-3 may be hollowed out. In this way, the PCB ground that is hollowed out on a secondary screen portion and the specific portion of the secondary-screen metal bezel 12-3 enclose to form a slot 52-B. Two ends of the slot 52-B are closed (which may be referred to as closed ends). One side of the slot 52-B is the secondary-screen metal bezel 12-3, and the other side of the slot 52-B is the PCB ground on the secondary screen portion. The slot 52-B is the slot 32 in FIG. 7C. FIG. 10A further shows a feeding manner of the secondary-screen antenna. A feed point 53-B may be disposed on a side that is of the slot 52-B and on which the metal bezel (such as a metal bezel 51-B) is located, to connect a feeder 54-B to a feed source. In addition, no gap is provided on the side that is of the slot 52-B and on which the feed point is disposed. The feed point 53-B may be disposed close to a middle position of the metal bezel 51-B, to excite a DM slot antenna pattern. In addition to a position close to the middle position, the feed point 53-B may alternatively be disposed close to a closed end of the slot 52-B. Being close herein may mean that a distance from the feed point 53-B to the middle position or the closed end is less than 1/16 of an operating wavelength. Being close may also include a case in which the distance is equal to 0.

Herein, that the feed point 53-B is disposed in the middle position of the suspended metal bezel 51-B (in this case, the distance is equal to 0) may mean that the feed point 53-B is disposed at a midpoint of the suspended metal bezel 51-B. In other words, a connection position for the feeder 54-B and the suspended metal bezel 51-B covers the midpoint.

The primary-screen antenna and the secondary-screen antenna in FIG. 10A may be antennas that operate on a same frequency band. For current distribution on the primary-screen antenna, reference may be made to FIG. 3A. To be specific, currents on the suspended metal bezel 51-A are symmetrically and reversely distributed. For electric field distribution on the secondary-screen antenna, reference may be made to FIG. 6A. To be specific, electric fields in the slot 52-B are codirectionally distributed. For a radiation direction of the primary-screen antenna, reference may be made to FIG. 3B. To be specific, the primary-screen antenna radiates in a direction along the suspended metal bezel 41-A. For a radiation direction of the secondary-screen antenna, reference may be made to FIG. 6B. To be specific, the secondary-screen antenna radiates in a direction perpendicular to the slot 52-B.

FIG. 10B shows an example of a position relationship between the primary-screen antenna and the secondary-screen antenna when the foldable screen 11 is in the folded state. When the foldable screen 11 is in the folded state, positions of the primary-screen antenna and the secondary-screen antenna overlap. The overlap does not affect performance of the primary-screen antenna and the secondary-screen antenna because the primary-screen antenna and the secondary-screen antenna are respectively the CM wire antenna and the DM slot antenna whose radiation directions are orthogonal. Even if the primary-screen antenna and the secondary-screen antenna operate on a same frequency band, good isolation performance can also be obtained. In this way, two antennas operating on a same frequency band can be disposed in overlapping areas of the primary screen and the secondary screen, and directivity patterns of the two antennas are complementary.

Embodiment 3

Figure 11A:
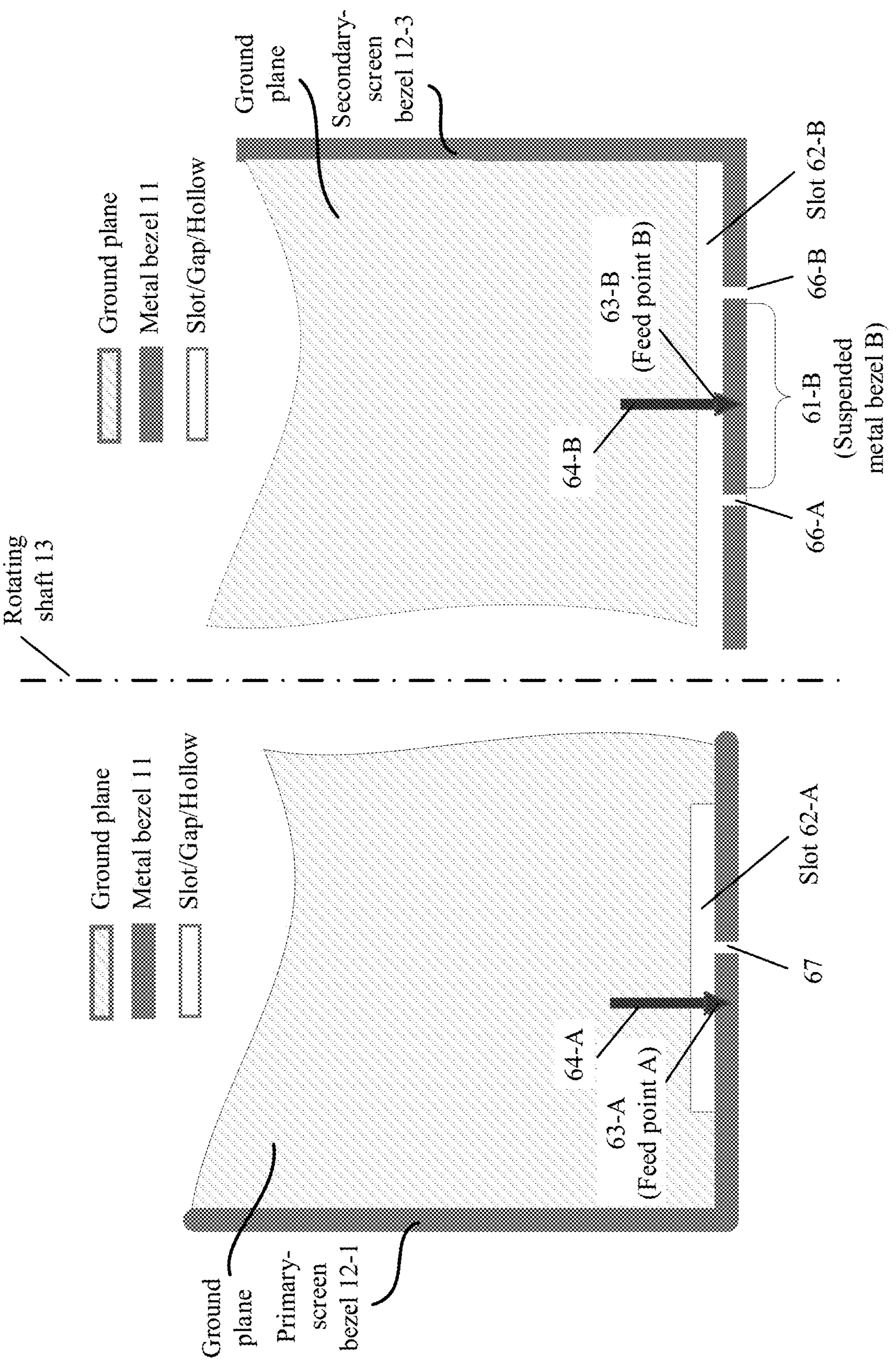
FIG. 11A and FIG. 11B are schematic diagrams of implementation of an antenna design solution shown in FIG. 7C in an electronic device.
Figure 11B:
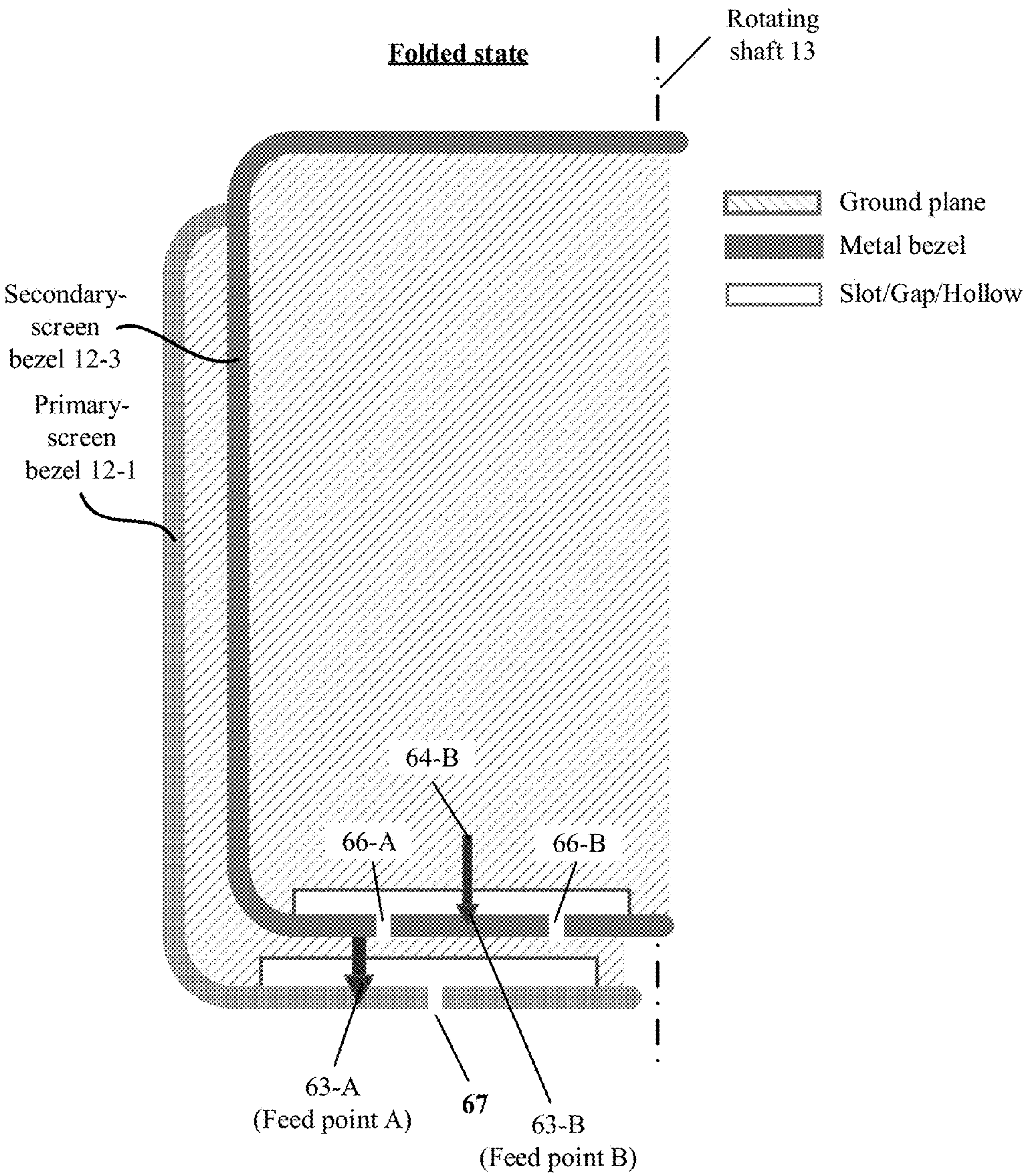

FIG. 11A and FIG. 11B show examples of an antenna structure provided in Embodiment 3. FIG. 11A shows an antenna structure formed when a foldable screen 11 is in an open state, and FIG. 11B shows an antenna structure formed when the foldable screen 11 is in a folded state. The antenna structure provided in Embodiment 3 includes a primary-screen antenna and a secondary-screen antenna, where the primary-screen antenna may be a CM slot antenna and the secondary-screen antenna may be a DM wire antenna.

As shown in FIG. 11A, the primary-screen antenna may be implemented by hollowing out a PCB ground and opening a gap on a metal bezel. Specifically, a PCB ground adjacent to a specific portion (such as a bottom bezel portion) of a primary-screen metal bezel 12-1 may be hollowed out. The PCB ground that is hollowed out on a primary screen portion and the primary-screen metal bezel 12-1 enclose to form a slot 62-A. Two ends of the slot 62-A are closed. One side of the slot 62-B is the primary-screen metal bezel 12-1, and the other side of the slot 62-A is the PCB ground on the primary screen portion. In addition, a gap, such as a gap 67, may be provided on the metal bezel on a side of the slot 62-A, to connect the slot 62-A to external free space. The slot 62-A is the slot 26 in FIG. 7B, and the gap 67 is the gap 28 in FIG. 7B. The gap 67 may be provided in a middle position of the metal bezel on the side of the slot 62-A. The middle position is a midpoint on the side of the slot 62-A. In other words, a position of the gap 67 covers the midpoint.

FIG. 11A further shows a feeding manner of the primary-screen antenna. A feed point 63-A may be disposed on a side that is of the slot 62-A and on which the metal bezel is located, to connect a feeder 64-A to a feed source. The feed point 63-A may be disposed close to the gap 67, to excite a CM wire antenna pattern. In addition to a position close to the gap 67, the feed point 63-A may alternatively be disposed close to a closed end of the slot 62-A. Herein, that the feed point 63-A is close to the gap 67 may mean that a distance from the feed point 63-A to the gap 67 is greater than 0 and less than ⅛ of an operating wavelength. That the feed point 63-A is close to a closed end of the slot 62-A may mean that a distance from the feed point 63-A to the closed end is less than ⅛ of the operating wavelength. Being close may also include a case in which the distance is equal to 0. The operating wavelength is an operating wavelength of the primary-screen antenna in a CM slot antenna pattern. A manner of calculating the operating wavelength is described in the following content, and details are not described herein.

Herein, the distance from the feed point 63-A to the gap 67 may be a distance from the feed point 63-A to a midpoint of the gap 67, or may be a distance from the feed point 63-A to two ends of the gap 67.

As shown in FIG. 11A, the secondary-screen antenna in Embodiment 3 is the same as the secondary-screen antenna shown in FIG. 8A, and may be implemented by hollowing out a PCB ground and opening a gap on a metal bezel. For details, refer to related descriptions of the secondary-screen antenna in FIG. 8A, and details are not described herein.

The primary-screen antenna and the secondary-screen antenna in FIG. 11A may be antennas that operate on a same frequency band. For electric field distribution on the primary-screen antenna, reference may be made to FIG. 7B. To be specific, electric fields in the slot 62-A are symmetrically and reversely distributed. For current distribution on the secondary-screen antenna, reference may be made to FIG. 7B. To be specific, currents on a suspended metal bezel 61-B are codirectionally distributed. For a radiation direction of the primary-screen antenna, reference may be made to FIG. 5B. To be specific, the primary-screen antenna radiates in a direction along the slot 62-A. For a radiation direction of the secondary-screen antenna, reference may be made to FIG. 4B. To be specific, the secondary-screen antenna radiates in a direction perpendicular to the suspended metal bezel 61-B.

FIG. 11B shows an example of a position relationship between the primary-screen antenna and the secondary-screen antenna when the foldable screen 11 is in the folded state. When the foldable screen 11 is in the folded state, positions of the primary-screen antenna and the secondary-screen antenna overlap. The overlap does not affect performance of the primary-screen antenna and the secondary-screen antenna because the primary-screen antenna and the secondary-screen antenna are respectively the CM slot antenna and the DM wire antenna whose radiation directions are orthogonal. Even if the primary-screen antenna and the secondary-screen antenna operate on a same frequency band, good isolation performance can also be obtained. In this way, two antennas operating on a same frequency band can be disposed in overlapping areas of the primary screen and the secondary screen, and directivity patterns of the two antennas are complementary.

Embodiment 4

Figure 12A:
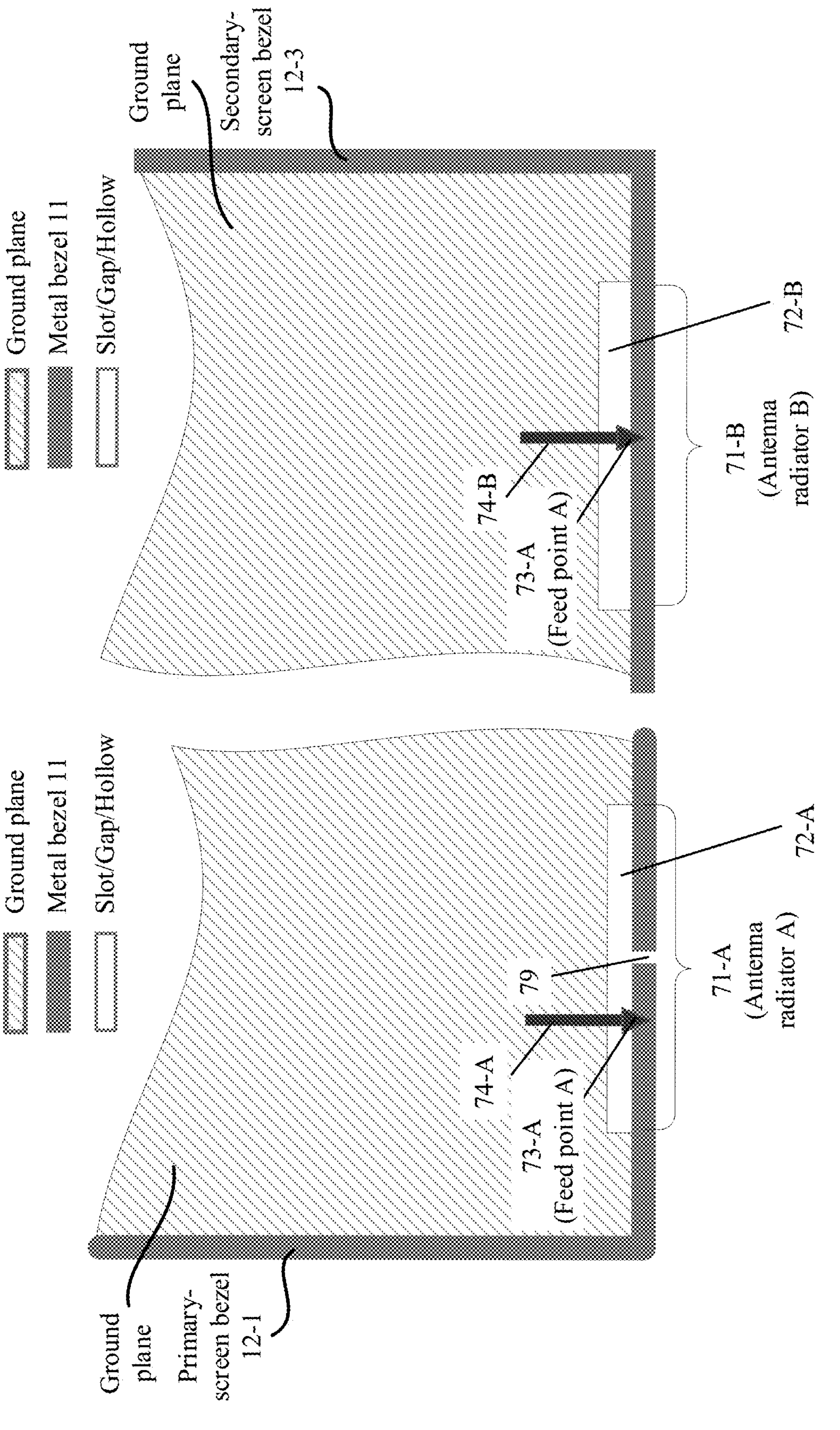
FIG. 12A and FIG. 12B are schematic diagrams of implementation of an antenna design solution shown in FIG. 7D in an electronic device.
Figure 12B:
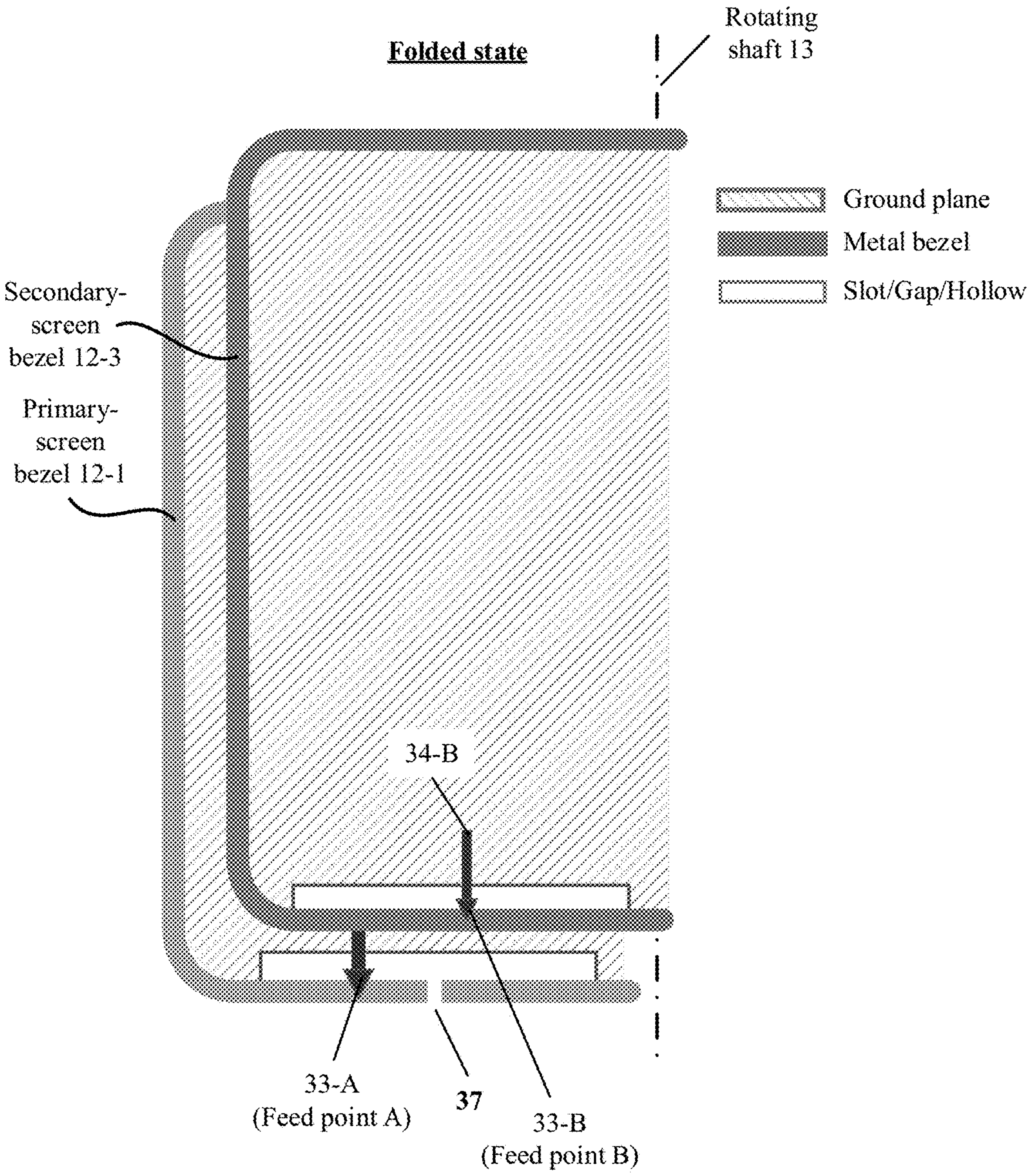

FIG. 12A and FIG. 12B show examples of an antenna structure provided in Embodiment 4. FIG. 12A shows an antenna structure formed when a foldable screen 11 is in an open state, and FIG. 12B shows an antenna structure formed when the foldable screen 11 is in a folded state. The antenna structure provided in Embodiment 4 includes a primary-screen antenna and a secondary-screen antenna, where the primary-screen antenna may be a CM slot antenna and the secondary-screen antenna may be a DM slot antenna.

As shown in FIG. 12A, the primary-screen antenna in Embodiment 4 is the same as the primary-screen antenna shown in FIG. 11A, and may be implemented by hollowing out a PCB ground and opening a gap on a metal bezel. For details, refer to related descriptions of the primary-screen CM slot antenna in FIG. 11A, and details are not described herein.

As shown in FIG. 12A, the secondary-screen antenna in Embodiment 4 is the same as the secondary-screen antenna shown in FIG. 10A, and may be implemented by hollowing out a PCB ground and opening a gap on a metal bezel. For details, refer to related descriptions of the secondary-screen DM slot antenna in FIG. 10A, and details are not described herein.

The primary-screen antenna and the secondary-screen antenna in FIG. 12A may be antennas that operate on a same frequency band. For electric field distribution on the primary-screen antenna, reference may be made to FIG. 7D. To be specific, electric fields in a slot 72-A are symmetrically and reversely distributed. For current distribution on the secondary-screen antenna, reference may be made to FIG. 7D. To be specific, currents in the slot 72-A are codirectionally distributed. For a radiation direction of the primary-screen antenna, reference may be made to FIG. 5B. To be specific, the primary-screen antenna radiates in a direction along the slot 72-A. For a radiation direction of the secondary-screen antenna, reference may be made to FIG. 6B. To be specific, the secondary-screen antenna radiates in a direction perpendicular to the slot 72-A.

FIG. 12B shows an example of a position relationship between the primary-screen antenna and the secondary-screen antenna when the foldable screen 11 is in the folded state. When the foldable screen 11 is in the folded state, positions of the primary-screen antenna and the secondary-screen antenna overlap. The overlap does not affect performance of the primary-screen antenna and the secondary-screen antenna because the primary-screen antenna and the secondary-screen antenna are respectively the CM slot antenna and the DM slot antenna whose radiation directions are orthogonal. Even if the primary-screen antenna and the secondary-screen antenna operate on a same frequency band, good isolation performance can also be obtained. In this way, two antennas operating on a same frequency band can be disposed in overlapping areas of the primary screen and the secondary screen, and directivity patterns of the two antennas are complementary.

Antennas on a foldable screen in the foregoing embodiments are disposed at overlapping positions of the foldable screen in a folded state. In this way, antennas that operate on a same frequency band can have good performance. Further, space utilization of a primary screen and a secondary screen in a foldable-screen antenna design can be improved, and more antennas can be disposed. This is especially beneficial to a MIMO antenna design.

Figure 13A:
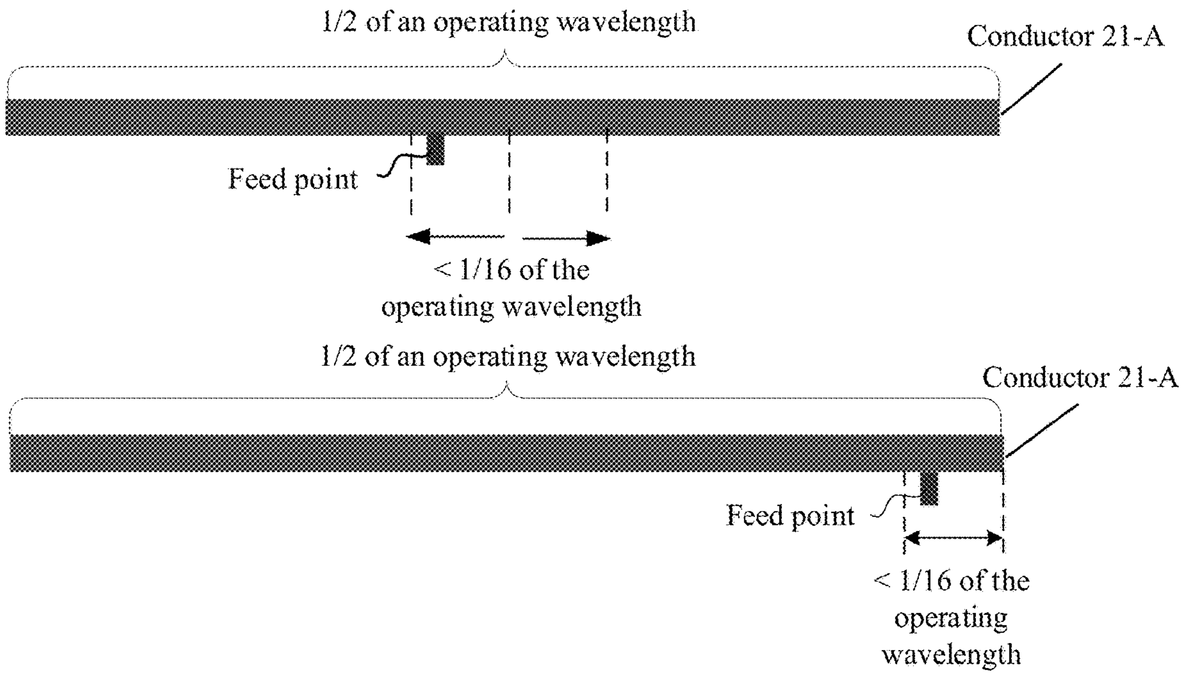
FIG. 13A and FIG. 13B show feed positions of a CM wire antenna and a DM wire antenna according to this application.
Figure 13B:
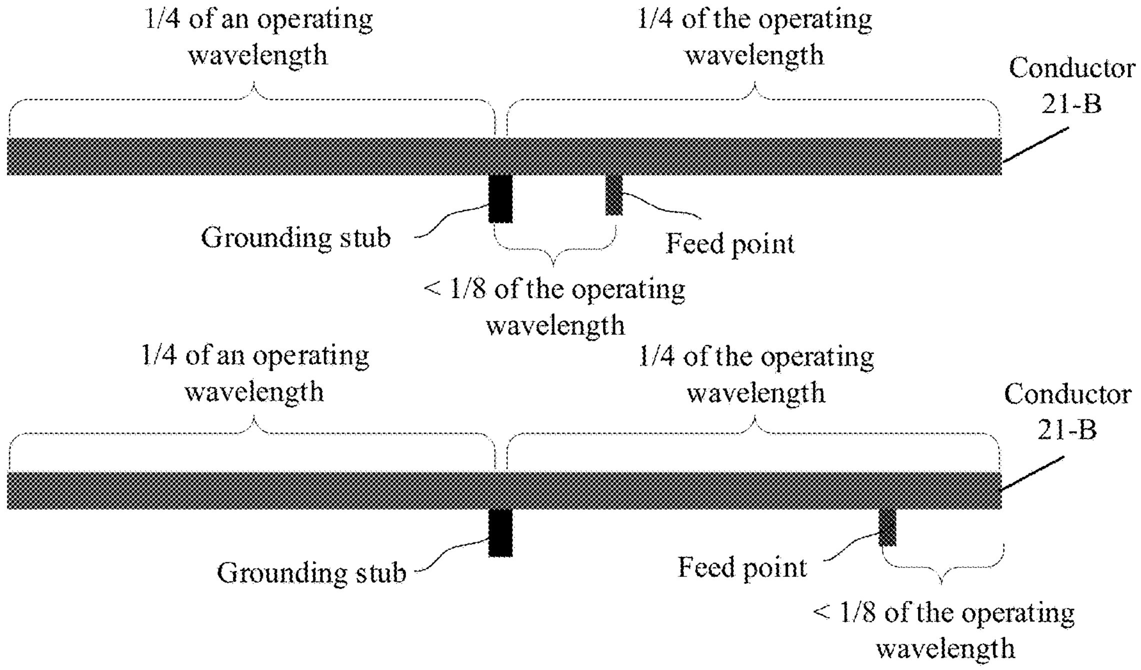

FIG. 13A and FIG. 13B show feed positions in antenna structures according to an embodiment of this application.

As shown in FIG. 13A, a feed position of a DM wire antenna may be disposed close to a middle position of a radiator. In addition to a position close to the middle position, the feed position may alternatively be disposed close to an open end of the radiator. Being close may mean that a distance from the feed point to the middle position or the open end of the radiator is less than a first distance. For example, the first distance is equal to 1/16 of an operating wavelength. To be specific, the distance is greater than 0 and less than 1/16 of the operating wavelength. Being close may also include a case in which the distance is equal to 0. Herein, the operating wavelength is an operating wavelength in a DM wire antenna pattern. For a position relationship between a feed position and a slot of a DM slot antenna, reference may be made to FIG. 13A. The slot may be considered as a radiator of the slot antenna. The feed position may be disposed close to a middle position of the slot, or close to a closed end of the slot. As described in the foregoing embodiments, the slot may be formed through enclosing by a metal bezel and a PCB ground by hollowing out the PCB ground.

As shown in FIG. 13B, a feed position of a CM wire antenna may be disposed close to a ground point (a connection point for a grounding stub and a radiator) of the radiator. In addition to a position close to the ground point, the feed position may alternatively be disposed close to an open end of the radiator. Herein, that the feed point is close to the ground point may mean that a distance from the feed point to the ground point is less than a second distance. For example, the second distance is equal to 1/8 of an operating wavelength. To be specific, the distance is greater than 0 and less than 1/8 of the operating wavelength. That the feed point is close to the open end may mean that a distance from the feed point to the open end is not greater than 1/8 of the operating wavelength, and being close may include a case in which the distance is equal to 0. The operating wavelength is an operating wavelength in a CM wire antenna pattern. For a position relationship between a feed position and a slot of a CM slot antenna, reference may be made to FIG. 13B. The slot may be considered as a radiator of the slot antenna. The feed position may be disposed close to a gap on a side of the slot, or close to a closed end of the slot.

FIG. 14A to FIG. 14G show size designs that are used when an antenna structure provided in an embodiment of this application is implemented as antennas that operate on several typical frequency bands.

Figure 14A:
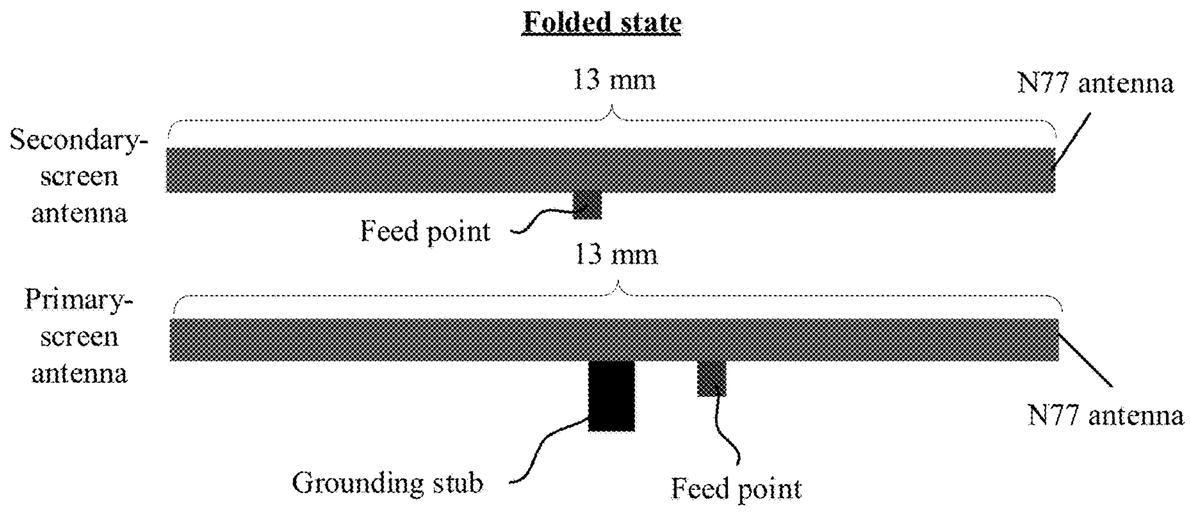
FIG. 14A to FIG. 14G show example sizes that may be used when a primary-screen antenna and a secondary-screen antenna in this application are implemented on several typical frequency bands and related simulation results.

As shown in FIG. 14A, a primary-screen antenna and a secondary-screen antenna each may be an antenna that operates on an N77 frequency band. A length of a radiator for each of the primary-screen antenna and the secondary-screen antenna may be approximately 13 millimeters. However, no limitation is imposed on the length, and an antenna radiation length of each of the primary-screen N77 antenna and the secondary-screen N77 antenna may alternatively be adjusted by using a tuning switch. For isolation performance between the primary-screen antenna and the secondary-screen antenna in the antenna structure shown in FIG. 14A, reference may be made to FIG. 9E.

Figure 14B:
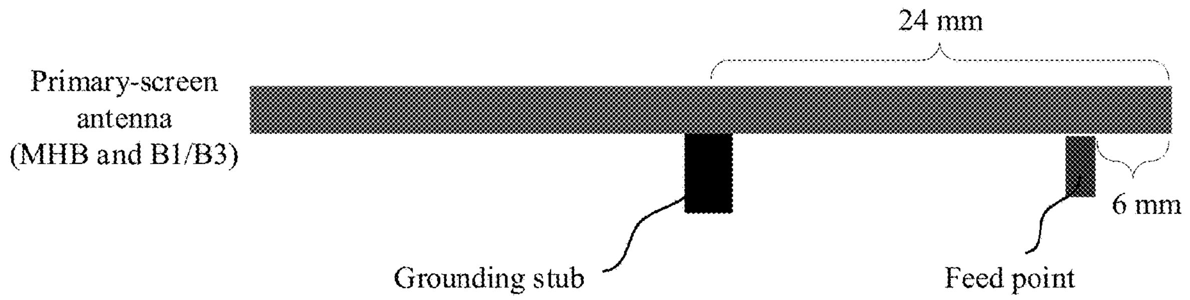
Figure 14C:
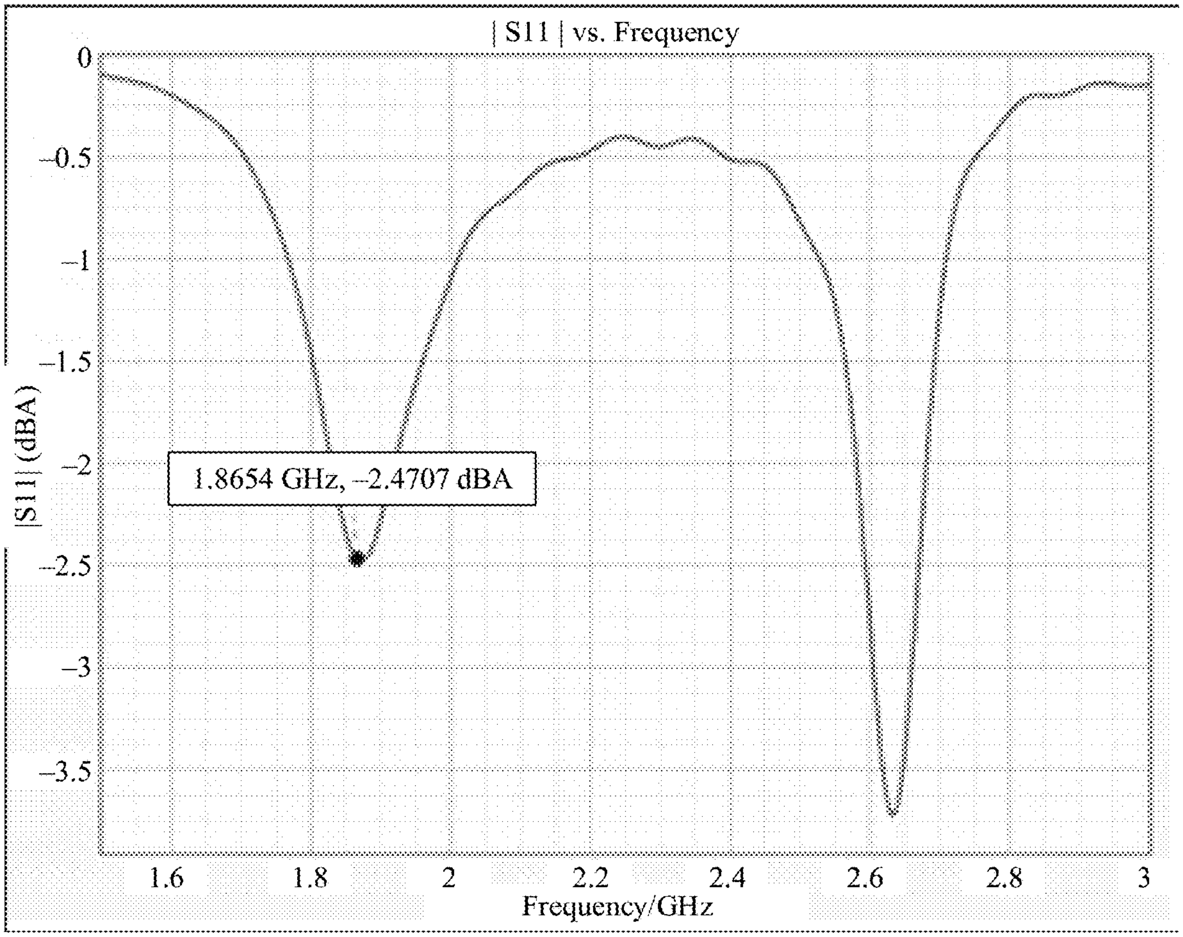

As shown in FIG. 14B, a half-length of a radiator for the primary-screen antenna may be approximately 24 millimeters, and a length from a feed point to an open end may be approximately 6 millimeters. In other words, a size of the primary-screen antenna may be changed so that the primary-screen antenna operates on a mid-high band MHB and a B1/B3 frequency band. However, no limitation is imposed on the length, and an antenna radiation length of the primary-screen antenna may alternatively be adjusted by using a tuning switch. FIG. 14C shows that the primary-screen antenna in FIG. 14B resonates in the MHB and the B1/B3 frequency band.

Figure 14D:
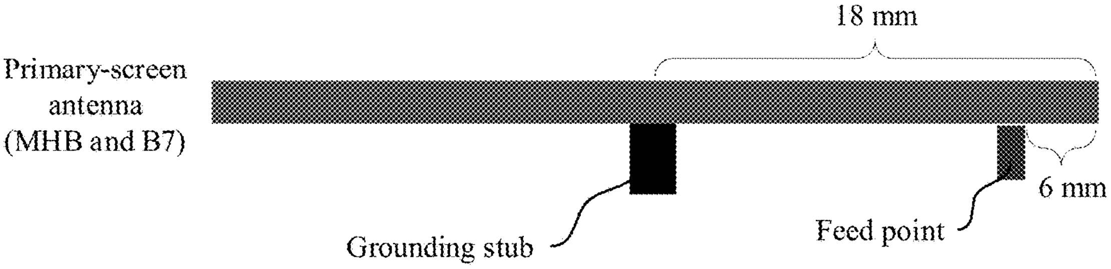
Figure 14E:
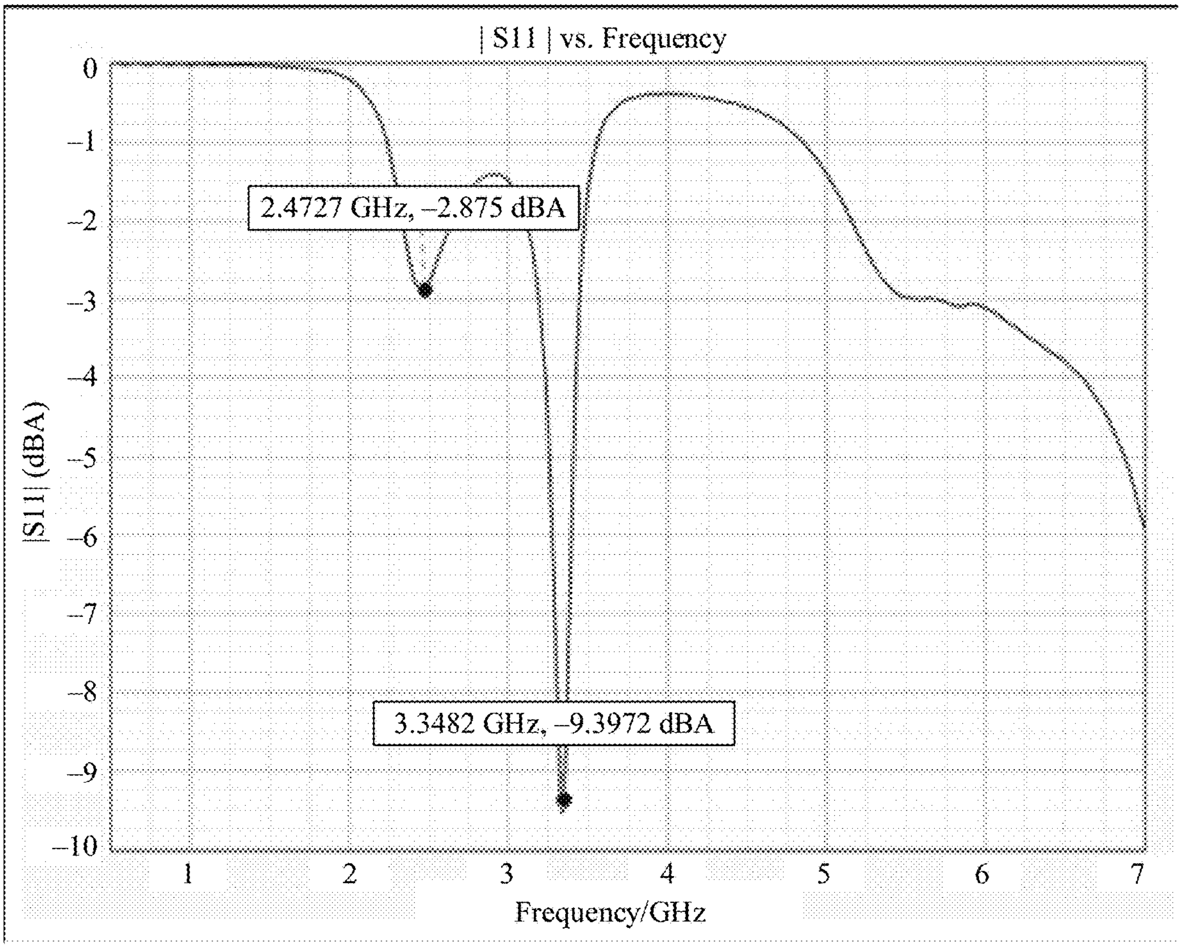

As shown in FIG. 14D, a half-length of a radiator for the primary-screen antenna may be approximately 18 millimeters, and a length from a feed point to an open end may be 6 millimeters. In other words, a size of the primary-screen antenna may be changed so that the primary-screen antenna operates on the mid-high band MHB and a B7 frequency band. However, no limitation is imposed on the length, and an antenna radiation length of the primary-screen antenna may alternatively be adjusted by using the tuning switch. FIG. 14E shows that the primary-screen antenna in FIG. 14D resonates in the MHB and the B7 frequency band.

Figure 14F:
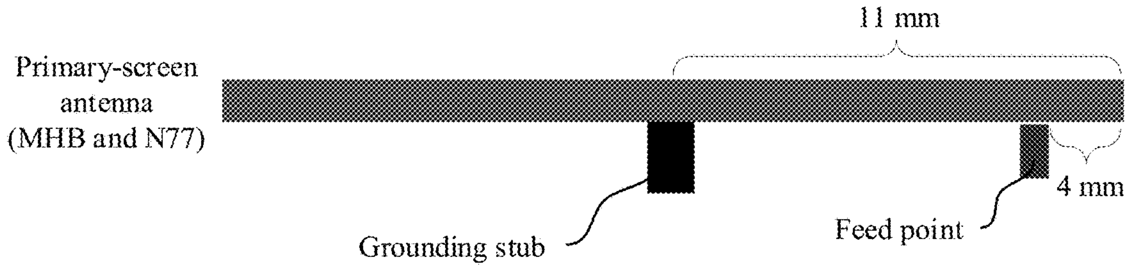
Figure 14G:
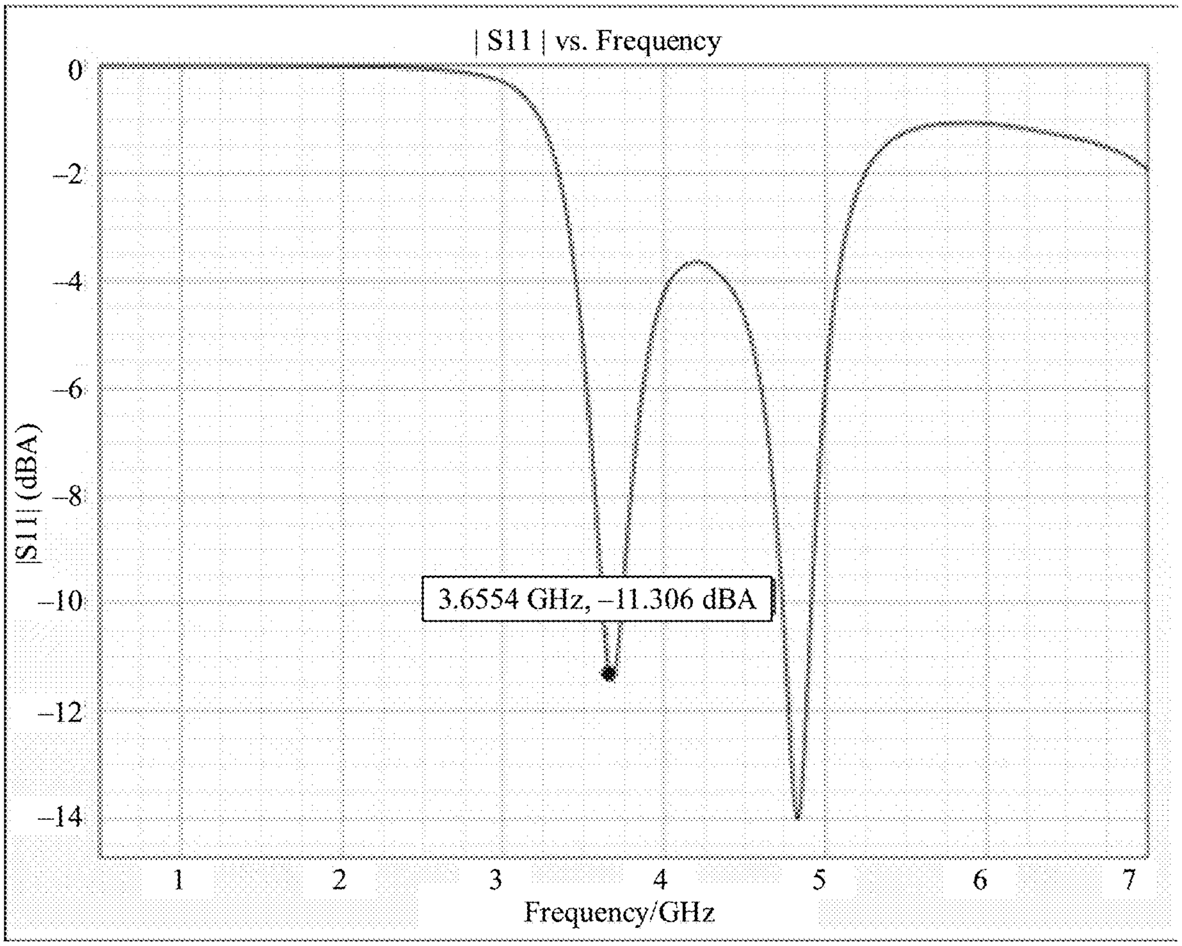

As shown in FIG. 14F, a half-length of a radiator for the primary-screen antenna may be approximately 11 millimeters, and a length from a feed point to an open end may be 4 millimeters. In other words, a size of the primary-screen antenna may be changed so that the primary-screen antenna operates on the mid-high band MHB and the N77 frequency band. However, no limitation is imposed on the length, and an antenna radiation length of the primary-screen antenna may alternatively be adjusted by using the tuning switch. FIG. 14G shows that the primary-screen antenna in FIG. 14F resonates in the MHB and the N77 frequency band.

In addition to the several typical frequency bands shown in FIG. 14A to FIG. 14G, the primary-screen antenna and the secondary-screen antenna provided in embodiments of this application may alternatively operate on another frequency band. In this application, an operating wavelength in a specific wavelength mode (such as a 1/2 wavelength mode) of an antenna may be a wavelength of a signal radiated by the antenna. For example, a suspended metal antenna in the 1/2 wavelength mode may generate a resonance of a 1.575

GHz frequency band, where an operating wavelength in the ½ wavelength mode is a wavelength of a signal radiated by the antenna on the 1.575 GHz frequency band. It should be understood that a wavelength of a radiated signal in the air may be calculated based on the following formula: Wavelength=Speed of light/Frequency, where the frequency is a frequency of the radiated signal. A wavelength of the radiated signal in a medium may be calculated based on the following formula: Wavelength=(Speed of light/$\sqrt{\varepsilon}$)/Frequency, where ε is a relative dielectric constant of the medium, and the frequency is the frequency of the radiated signal. The gap and the slot in the foregoing embodiments may be filled with an insulating medium.

In the foregoing embodiments, 1/16 of an operating wavelength and ⅛ of an operating wavelength are mentioned, where the "operating wavelength" may be a wavelength corresponding to a center frequency of a resonance frequency. For example, it is assumed that a center frequency of a B1 uplink frequency band (the resonance frequency is from 1920 MHz to 1980 MHz) is 1955 MHz. In this case, the operating wavelength may be a wavelength calculated based on the frequency of 1955 MHz. Not limited to the center frequency, the "operating wavelength" may alternatively be a wavelength corresponding to a non-center frequency of the resonance frequency.

The term "close" mentioned in the foregoing embodiments is constrained by using 1/16 of the operating wavelength and ⅛ of the operating wavelength as critical values. However, the two values are merely examples. That a feed point or a grounding stub is close to a position (for example, close to a middle position or an open end of a radiator) means that a distance between the feed point or the grounding stub and the position does not exceed a specific distance. In this way, a position relationship of "being close" is constrained. The examples in the foregoing embodiments may be used as an implementation.

In the foregoing embodiments, an open end and a closed end are, for example, relative to a ground. The closed end is grounded and the open end is not grounded. Alternatively, the open end and the closed end are, for example, relative to another conductor. The closed end is electrically connected to another conductor, and the open end is not electrically connected to the another conductor.

In addition, in the foregoing content of this application, a limitation on a position or a distance, such as a middle or a middle position, is relative to the state of the art, and is not strictly defined in a mathematical sense. For example, a middle position of a conductor is a midpoint of the conductor. In actual application, a connection position for another component (such as a feeder or the grounding stub) and the conductor covers the midpoint. A middle position in a slot or a middle position on a side of the slot is a midpoint on a side of the slot. In actual application, a connection position for another component (such as the feeder) and the side covers the midpoint. In actual application, that a gap is provided in a middle position on a side of a slot means that a position of the gap on the side covers a midpoint of the side.

The feed point mentioned in the foregoing content of this application may be any point, such as a center point, in a connection area (which may also be referred to as a connection position) between a feeder and a conductor. A distance from a point (such as a feed point, a connection point, or a ground point) to a gap or from a gap to a point may be a distance from the point to a midpoint of the gap, or may be a distance from the point to two ends of the gap.

Co-directional/reverse distribution of currents mentioned in the foregoing content of this application should be understood as that directions of primary currents on conductors on a same side are consistent/reverse. For example, when codirectionally distributed currents are excited on an annular conductor (for example, a current path is also annular), it should be understood that the currents meet a definition of being codirectionally distributed in this application even if directions of primary currents excited on conductors on two sides of the annular conductor (for example, on conductors surrounding a gap, or on conductors on two sides of the gap) are reverse.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising a first device body, a second device body, and a rotating shaft, wherein the first device body and the second device body are connected through the rotating shaft, and the electronic device is configured to be foldable at the rotating shaft; and the electronic device further comprises a first antenna disposed on the first device body and a second antenna disposed on the second device body, wherein the first antenna comprises a strip-shaped first conductor and a first feed point disposed on the first conductor, wherein two ends of the first conductor are open, and a distance from the first feed point to a middle position of the first conductor is greater than or equal to zero and less than 1/16 of an operating wavelength of the first antenna, or a distance from the first feed point to one of the open ends of the first conductor is greater than or equal to zero and less than 1/16 of an operating wavelength of the first antenna; and the second antenna is an inverted F antenna that comprises a strip-shaped second conductor, and a second feed point and a grounding stub that are disposed on the second conductor, wherein one end of the second conductor is open, the other end of the second conductor is grounded through the grounding stub, and a distance from the second feed point to a connection point for the second conductor and the grounding stub is greater than zero and less than ⅛ of an operating wavelength of the second antenna, or a distance from the second feed point to the open end of the second conductor is greater than or equal to zero and less than ⅛ of an operating wavelength of the second antenna, wherein the first conductor and the second conductor at least partially overlap when the electronic device is in a folded state.

2. The electronic device according to claim 1, wherein an operating frequency of the first antenna and an operating frequency of the second antenna comprise a same frequency band.

3. The electronic device according claim 1, wherein that the first conductor and the second conductor at least partially overlap when the electronic device is in the folded state comprises: a projection of the first conductor and a projection of the second conductor partially or fully overlap on a plane on which the first device body is located or a plane on which the second device body is located.

4. The electronic device according to claim 1, wherein the electronic device further comprises a bezel of the first device body and a ground of the first device body; and the first conductor is a strip-shaped conductor disposed on the bezel of the first device body, the first conductor is separated from the ground of the first device body by a first slot, the first slot is formed by hollowing out the ground of the first device body, the first slot is adjacent to the first conductor, and the first conductor is not grounded.

5. The electronic device according to claim 4, wherein the electronic device further comprises a bezel of the second device body and a ground of the second device body; and the second conductor is a strip-shaped conductor disposed on the bezel of the second device body, the second conductor and the ground of the second device body are separated by a second slot and connected through the grounding stub, the second slot is formed by hollowing out the ground of the second device body, and the second slot is adjacent to the second conductor.

6. The electronic device according to claim 5, wherein the grounding stub is a strip-shaped ground portion that is disposed in a hollowed-out portion of the ground of the second device body and that is connected to the second conductor, or the grounding stub is a metal elastic piece that is disposed on the ground of the second device body and that is connected to the second conductor, or the grounding stub is a conductive stub that extends from the second conductor and that is connected to the ground.

7. The electronic device according to claim 5, wherein the bezel of the first device body comprises a first metal bezel between a first gap and a second gap, the first conductor is the first metal bezel; and wherein the bezel of the second device body comprises a second metal bezel between a third gap and the grounding stub, the second conductor is the second metal bezel.

8. An electronic device, comprising a first device body, a second device body, and a rotating shaft, wherein the first device body and the second device body are connected through the rotating shaft, and the electronic device is configured to be foldable at the rotating shaft; and the electronic device further comprises a first antenna disposed on the first device body and a second antenna disposed on the second device body, wherein the first antenna comprises a strip-shaped first conductor and a first feed point disposed on the first conductor, wherein two ends of the first conductor are open, and a distance from the first feed point to a middle position of the first conductor is greater than or equal to zero and less than $1/16$ of an operating wavelength of the first antenna, or a distance from the first feed point to one of the open ends of the first conductor is greater than or equal to zero and less than $1/16$ of an operating wavelength of the first antenna; and the second antenna comprises a second conductor provided with a first slot, two ends of the first slot are closed and grounded, a first side of the first slot is provided with a first gap, a distance from the first gap to a middle position on the first side is less than $1/16$ of an operating wavelength of the second antenna, a second feed point is disposed on the first side of the first slot, and a distance from the second feed point to the first gap is greater than zero and less than $1/8$ of the operating wavelength of the second antenna, wherein the first conductor and the second conductor at least partially overlap when the electronic device is in a folded state.

9. The electronic device according to claim 8, wherein an operating frequency of the first antenna and an operating frequency of the second antenna comprise a same frequency band.

10. The electronic device according to claim 8, wherein that the first antenna and the second antenna at least partially overlap when the electronic device is in the folded state comprises: a projection of the first antenna and a projection of the second antenna partially or fully overlap on a plane on which the first device body is located or a plane on which the second device body is located.

11. The electronic device according to claim 8, wherein the electronic device further comprises a bezel of the first device body and a ground of the first device body; and the first conductor is a strip-shaped conductor disposed on the bezel of the first device body, the first conductor is separated from the ground of the first device body by a second slot, the second slot is formed by hollowing out the ground of the first device body, the second slot is adjacent to the first conductor, and the first conductor is not grounded.

12. The electronic device according to claim 11, wherein the bezel of the first device body comprises a first metal bezel between a first gap and a second gap, the first conductor is the first metal bezel.

13. The electronic device according to claim 8, wherein the electronic device further comprises a metal bezel of the second device body and a ground of the second device body; and the second conductor comprises the metal bezel of the second device body and the ground of the second device body that enclose to form the first slot, the first slot is disposed in a hollowed-out portion of the ground of the second device body, the first slot is adjacent to the metal bezel of the second device body, the first gap is a gap provided on the metal bezel that is of the second device body and adjacent to the first slot and that forms the first side of the first slot, the first gap is provided on the metal bezel on one side of the second feed point, and no gap is provided on the metal bezel on the other side of the second feed point.

14. An electronic device, comprising a first device body, a second device body, and a rotating shaft, wherein the first device body and the second device body are connected through the rotating shaft, and the electronic device is configured to be foldable at the rotating shaft; and the electronic device further comprises a first antenna disposed on the first device body and a second antenna disposed on the second device body, wherein the first antenna comprises a first conductor provided with a first slot, two ends of the first slot are closed and grounded, a first feed point is disposed on a first side of the first slot, and a distance from the first feed point to a middle position on the first side of the first slot is greater than or equal to zero and less than $1/16$ of an operating wavelength of the first antenna; and the second antenna is an inverted F antenna that comprises a strip-shaped second conductor, and a second feed point and a grounding stub that are disposed on the second conductor, wherein one end of the second conductor is open, the other end of the second conductor is grounded through the grounding stub, and a distance from the second feed point to a connection point for the second conductor and the grounding stub is greater than zero and less than $1/8$ of an operating wavelength of the second antenna, or a distance from the second feed point to the open end of the second conductor is greater than or equal to zero and less than $1/8$ of an operating wavelength of the second antenna, wherein the first conductor and the second conductor at least partially overlap when the electronic device is in a folded state.

15. The electronic device according to claim 14, wherein an operating frequency of the first antenna and an operating frequency of the second antenna comprise a same frequency band.

16. The electronic device according to claim 14, wherein that the first antenna and the second antenna at least partially overlap when the electronic device is in the folded state comprises: a projection of the first antenna and a projection of the second antenna partially or fully overlap on a plane on which the first device body is located or a plane on which the second device body is located.

17. The electronic device according to claim 14, wherein the electronic device further comprises a bezel of the first device body and a ground of the first device body; and the first conductor is a strip-shaped conductor disposed on the bezel of the first device body, the first conductor and the ground of the first device body are separated by a second slot and connected through the grounding stub, the second slot is formed by hollowing out the ground of the first device body, and the second slot is adjacent to the first conductor.

18. The electronic device according to claim 17, wherein the bezel of the first device body comprises a first metal bezel between a first gap and the grounding stub, the first conductor is the first metal bezel.

19. The electronic device according to claim 17, wherein the grounding stub is a strip-shaped ground portion that is formed by hollowing out the ground of the first device body and that is connected to the first conductor, or the grounding stub is a metal elastic piece that is disposed on the ground of the first device body and that is connected to the first conductor, or the grounding stub is a conductive stub that extends from the first conductor and that is connected to the ground.

20. The electronic device according to claim 14, wherein the electronic device further comprises a metal bezel of the second device body and a ground of the second device body; and the second conductor comprises the metal bezel of the second device body and the ground of the second device body that enclose to form the first slot, the first slot is disposed in a hollowed-out portion of the ground of the second device body, the first slot is adjacent to the metal bezel of the second device body, and no gap is provided on the metal bezel that is of the second device body and adjacent to the first slot and that forms a first side of the first slot.

* * * * *